United States Patent
Zaltzman et al.

(10) Patent No.: US 11,871,310 B2
(45) Date of Patent: *Jan. 9, 2024

(54) CONTENT RECOMMENDATION AND DISPLAY BASED ON GEOGRAPHIC AND USER CONTEXT

(71) Applicant: SKYSCANNER LIMITED, London (GB)

(72) Inventors: Ori Zaltzman, London (GB); Travis Katz, London (GB)

(73) Assignee: SKYSCANNER LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,992

(22) Filed: Jul. 21, 2022

(65) Prior Publication Data

US 2022/0360956 A1 Nov. 10, 2022

Related U.S. Application Data

(63) Continuation of application No. 16/491,603, filed as application No. PCT/US2018/021267 on Mar. 7, 2018, now Pat. No. 11,399,264, which is a continuation-in-part of application No. 15/452,418, filed on Mar. 7, 2017, now Pat. No. 10,825,117.

(51) Int. Cl.
| | |
|---|---|
| *H04W 4/23* | (2018.01) |
| *G06F 3/0485* | (2022.01) |
| *G06Q 50/14* | (2012.01) |
| *H04W 4/029* | (2018.01) |

(Continued)

(52) U.S. Cl.
CPC ............ *H04W 4/23* (2018.02); *G06F 3/0485* (2013.01); *G06F 3/04883* (2013.01); *G06Q 50/12* (2013.01); *G06Q 50/14* (2013.01); *H04W 4/029* (2018.02)

(58) Field of Classification Search
CPC ....... H04W 4/23; H04W 4/029; H04W 4/021; G06Q 50/14; G06Q 50/12; G06Q 30/0282; G06Q 30/0631; G06Q 30/0643; G06Q 10/02; G06F 3/0485; G06F 3/04883; G06F 3/0481; G06F 16/9537
See application file for complete search history.

(56) References Cited

U.S. PATENT DOCUMENTS

| | | |
|---|---|---|
| 9,243,913 B1 | 1/2016 | Lehman |
| 2012/0284105 A1 | 11/2012 | Li |

(Continued)

*Primary Examiner* — Farid Seyedvosoghi
(74) *Attorney, Agent, or Firm* — Saul Ewing LLP

(57) ABSTRACT

A travel system generates and provides content recommendations to a user of the travel system. The travel system identifies content categories that are likely to be of interest to the user of the travel system based on context characteristics of the user such as whether the user is a traveler or a local at a particular geographic location. Additionally, the travel system further identifies content objects (e.g., attractions, activities, events, restaurants, businesses, and the like) for each identified content category that are likely to be of interest to the user based on characteristics of each content object. The identified content categories and content objects are provided as content recommendations for display to a user of the travel system, enabling a user to quickly navigate between content categories and content objects within each content category.

25 Claims, 12 Drawing Sheets

(51) Int. Cl.
    *G06F 3/04883*     (2022.01)
    *G06Q 50/12*       (2012.01)

(56) References Cited

U.S. PATENT DOCUMENTS

| | | |
|---|---|---|
| 2014/0180798 A1 | 6/2014 | Bailey et al. |
| 2015/0220544 A1 | 8/2015 | Zaltzman et al. |
| 2016/0071197 A1* | 3/2016 | Elsworth ............ G06Q 30/0224 705/14.25 |
| 2016/0360382 A1 | 12/2016 | Gross et al. |
| 2016/0366546 A1 | 12/2016 | Yamasaki et al. |
| 2018/0260916 A1 | 9/2018 | Zaltzman et al. |

* cited by examiner

| Entity | Tribe Vector |
|---|---|
| User 1200  | Business: 0.85<br>Luxury: 0.18<br>Family: 0.44<br>Adventure: 0.31<br>Budget: 0.81<br>Student: 0.06 |
| User 1202  | Business: 0.07<br>Luxury: 0.01<br>Family: 0.77<br>Adventure: 0.75<br>Budget: 0.70<br>Student: 0.32 |
| Location 1204 | Business: 0.03<br>Luxury: 0.12<br>Family: 0.86<br>Adventure: 0.51<br>Budget: 0.81<br>Student: 0.92 |
| Review 1206 | Business: 0.18<br>Luxury: 0.96<br>Family: 0.66<br>Adventure: 0.92<br>Budget: 0.02<br>Student: 0.69 |

FIGURE 8

CONTENT RECOMMENDATION AND DISPLAY BASED ON GEOGRAPHIC AND USER CONTEXT

CROSS REFERENCE TO RELATED APPLICATIONS

This application is a continuation of U.S. application Ser. No. 16/491,603, filed on Sep. 6, 2019, which claims the priority of PCT/US2018/021267, filed on Mar. 7, 2018, which is a continuation-in-part of and claims priority to U.S. application Ser. No. 15/452,418, filed Mar. 7, 2017, the entire contents of each of which being fully incorporated herein by reference.

BACKGROUND OF THE INVENTION

1. Field of the Invention

The field of the invention relates to data processing, and more specifically to the selection of content for display to a user in a travel information system and database, and to related methods. The field of the invention may further relate to digital search and content retrieval, and more specifically to the selection and rating of locations and location-related content for display in a travel information system and database, and to related methods.

2. Technical Background

Travel systems are often designed to enable users to research and plan for travel. For instance, a user can select a destination that the user is interested in visiting, and can discover cities, hotels, restaurants, and tourist attractions within the location. Therefore, a travel system provides travel content to a user. However, conventional travel systems, in selecting content for display to users, do not take full advantage of relevant user information, resulting in the display of less-relevant content, and a sub-optimal experience for the users.

3. Discussion of Related Art

Websites dedicated to travel allow users the ability research and plan for upcoming trips. For instance, a user can select a destination that the user is interested in visiting (such as Italy), and can discover cities, hotels, restaurants, and tourist attractions within the location. Such websites, applications, and other travel-oriented portals (referred to herein as "travel systems") can mine travel-specific information from the activities of users within the travel systems.

SUMMARY OF THE INVENTION

According to a first aspect of the invention, there is provided a method for selecting content for display to a user in a travel system comprising:
  receiving, at a server of the travel system, a request from a mobile device of the user for content recommendations;
  receiving, from the mobile device of the user, a location of the user;
  identifying, by the server, a plurality of context characteristics of the user based on the location of the user;
  for each of a plurality of content categories, scoring the content category based on the identified plurality of context characteristics of the user;
  ranking, by the server, the plurality of content categories based on the content category scores;
  for each of a subset of the plurality of content categories selected based on the content category rankings:
  identifying, by the server, one or more content objects corresponding to the content category, each content object associated with a physical location within a threshold proximity of the location of the user; and
  for each identified content object, determining, by the server, a likelihood that the user is interested in the identified content object based on one or more characteristics of the content object; and
  updating, by the server, a display interface displayed by the mobile device of the user, the updated display interface comprising a plurality of interface portions such that each interface portion identifies a selected content category and displays a set of content objects corresponding to the selected content category and selected based on the determined likelihoods that the user is interested in the content objects.

An advantage is that more relevant content recommendations can be provided to the user.

The mobile device may be a smartphone or a tablet computer.

The displayed content objects may include advertisements, hotels, flights, train journeys or discounted travel deals.

Selected content categories may include one or more of: places to eat, events, things to do, hotels, flights, train journeys, or discounted travel deals.

According to a second aspect of the invention, there is provided a travel system including a server and a mobile device, the server including a processor and a non-transitory computer readable medium including instructions that, when executed by the processor, configure the server to:
  receive a request from a mobile device of a user for content recommendations;
  receive, from the mobile device of the user, a location of the user;
  identify a plurality of context characteristics of the user based on the location of the user;
  for each of a plurality of content categories, score the content category based on the identified plurality of context characteristics of the user;
  rank the plurality of content categories based on the content category scores;
  for each of a subset of the plurality of content categories selected based on the content category rankings:
  identify one or more content objects corresponding to the content category, each content object associated with a physical location within a threshold proximity of the location of the user; and
  for each identified content object, determine a likelihood that the user is interested in the identified content object based on one or more characteristics of the content object; and
  update a display interface displayed by the mobile device of the user,
  wherein the display interface of the mobile device comprises a plurality of interface portions such that each interface portion identifies a selected content category and displays a set of content objects corresponding to the selected content category and selected based on the determined likelihoods that the user is interested in the content objects.

According to a third aspect of the invention, there is provided a method for selecting content for display to a user in a travel system comprising:
- identifying, by a server of the travel system, a plurality of context characteristics of the user based on a location of the user;
- for each of a plurality of content categories, scoring the content category based on the identified plurality of context characteristics of the user;
- for each of a subset of the plurality of content categories selected based on a score of each content category:
- identifying, by the server, one or more content objects corresponding to the content category, each content object associated with a physical location within a threshold proximity of the location of the user; and
- updating, by the server, a display interface displayed by a mobile device of the user, the updated display interface comprising a plurality of interface portions such that each interface portion identifies a selected content category and displays the identified one or more content objects corresponding to the selected content category.

Optional features of the invention are recited in the dependent Claims. Optional features of the invention may be combined.

BRIEF DESCRIPTION OF THE FIGURES

Aspects of the invention will now be described, by way of example(s), with reference to the following Figures, in which:

FIG. 8 illustrates the display of locations selected based on tribe vectors in response to a search query.

Figure 1:
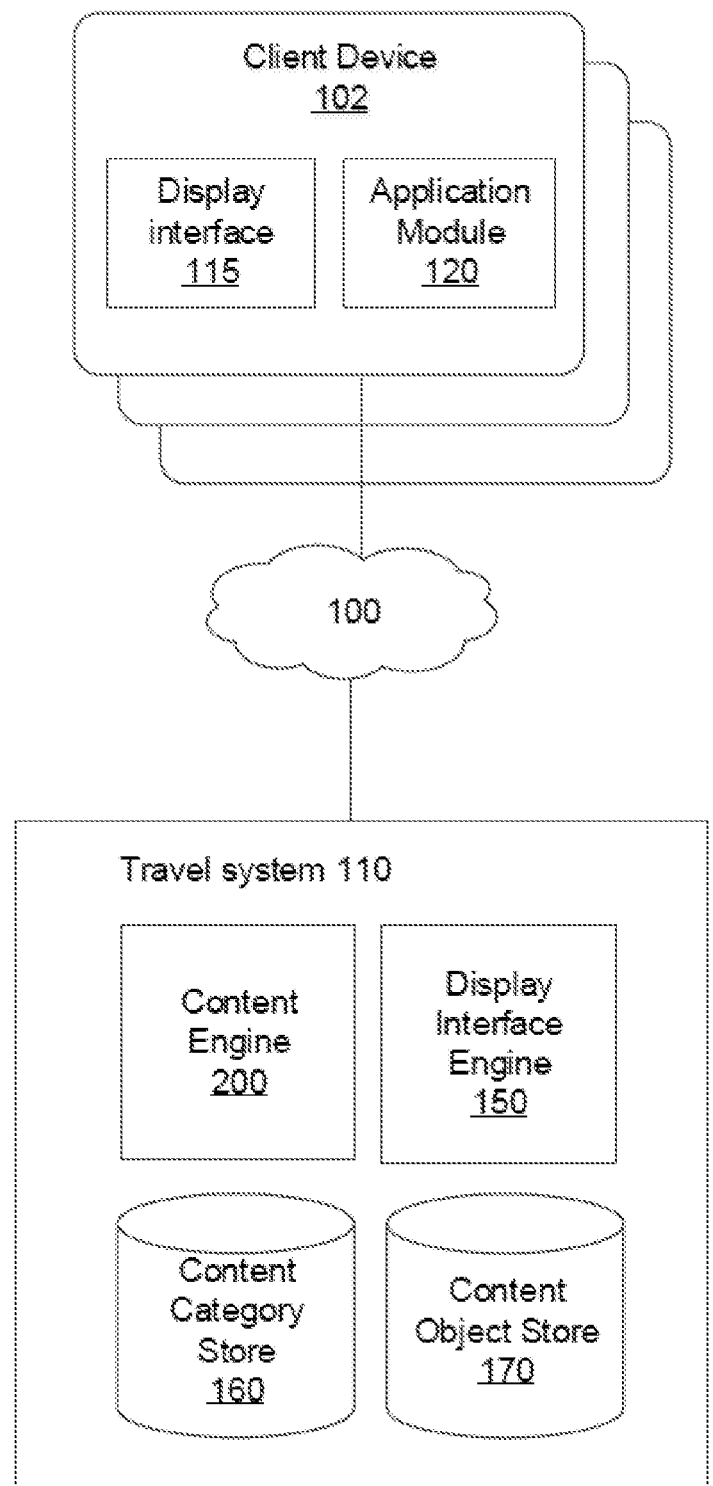
FIG. 1 illustrates a system environment for providing content recommendations within a travel system, in accordance with one example.

The figures depict various examples of the present invention, or of aspects of the present invention, for purposes of illustration only. One skilled in the art will readily recognize from the following discussion that alternative examples of the structures and methods illustrated herein may be employed without departing from the principles of the invention described herein.

DETAILED DESCRIPTION

A travel system generates and provides personalized and geographically proximate content recommendations to a user of the travel system in order to inform the user of content objects (e.g., activities, restaurants, attractions, hotels, gatherings, bars, landmarks, a public event and the like) that are likely to be of interest to the user. In various examples, the request for personalized content recommendations is sent by a client device to the travel system. The travel system provides content recommendations to the user for display within a display interface of the client device.

Content recommendations provided by the travel system include both content categories (e.g., "Breakfast and Brunch Spots", "Parks", etc.) as well as content objects (e.g., restaurants, activities, attractions, or other entities). The travel system identifies content categories that are likely to be of interest to the user of the travel system based on context characteristics of the user. For example, context characteristics of a user may include whether the user of the travel system is a visitor or a local in the user's current geographical location. Additional context characteristics of a user include the current time of day, current day of the week, a current or future weather forecast, a current or future environmental condition (e.g., temperature, air quality, humidity), preferences associated with similar users of the travel system, characteristics of the location (e.g., whether the user is in a dense urban area or a less dense rural or semi-rural area, or the existence of physical or geopolitical boundaries), and the like. For each content category, the travel system additionally identifies content objects associated with the content category that are likely to be of interest to the user of the travel system based on characteristics of the content object. A content object may be an attraction, activity, event, restaurant, business, and the like. A content object characteristic for a content object can include a distance from the user's current geographical location to the location of the content object, a current status of the content object (e.g., currently open/closed), suitability of the content object based on a context characteristic (e.g., current weather or time of day), popularity of the content object based on user reviews, an ease or availability of transportation to the content object, preferences of similar users of the travel system, and the like. In various examples, the travel system may score and rank each content category and each content object within a selected set of content categories, and may provide the ranked content recommendations for display within a display interface on the client device.

The client device receives the content recommendations and displays the content recommendations to the user of the travel system within a display interface. In various examples, the most prominently displayed content category displayed by the client device are determined by the travel system as likely to be of greatest interest to the user of the travel system in view of the context characteristics of the user. Additionally, the content object most prominently displayed within each content category is determined by the travel system as most likely to be of greatest interest to the user of the travel system in view of the characteristics of the content object. As such, the user of the travel system can receive and view relevant content recommendations within one or more relevant content categories.

System Environment

FIG. 1 illustrates a system environment for providing content recommendations within a travel system, in accordance with one example. The system environment includes a travel system 110 communicatively coupled to one or more client devices 102 through a network 100. It should be noted that in other examples, the system environment of FIG. 1 can include fewer, additional, or different components than illustrated herein.

The network 100 facilitates data transfer (e.g., communication) between the one or more client devices 102 and the travel system 110. The network 100 may be any wired or wireless local area network (LAN) and/or wide area network (WAN), such as an intranet, an extranet, or the Internet. In various examples, the network 100 uses standard communication technologies and/or protocols. Examples of technologies used by the network 100 include Ethernet, 802.11, 3G, 4G, 802.16, or any other suitable communication technology. The network 100 may use wireless, wired, or a combination of wireless and wired communication technologies. Examples of protocols used by the network 100 include transmission control protocol/Internet protocol (TCP/IP), hypertext transport protocol (HTTP), simple mail transfer protocol (SMTP), file transfer protocol (TCP), or any other suitable communication protocol. Additionally or alternatively, specialized application software that runs natively on a client device 102 is used as an interface to connect to the network 100. For example, a client device 102 may communicate with the network 100 through a software application previously installed on the client device 102.

A client device 102 is accessed by a user of the travel system 110. Examples of client devices 102 include a personal computer (PC), a desktop computer, a laptop computer, a notebook, a tablet PC, and the like. Further examples of client devices 102 include mobile devices, such as a personal digital assistant (PDA), a mobile telephone, a smartphone, a wearable technology (e.g., smart watch or smart glasses) or any other suitable computing device. The client device 102 can execute an operating system, for example, a Microsoft Windows-compatible operating system (OS), Apple OS X, Android, and/or a Linux distribution.

As depicted in FIG. 1, the client device 102 includes a display interface 115 and an application module 120 that enables the user of the travel system 110 to communicate with and receive information from the travel system 110. The application module 120 includes computer program code configured to be executed by a processor of the client device 102 to execute operations associated with an application installed on the client device 102. For example, an operation may be the opening of the application on the client device 102, the display of content object recommendations within the display interface 115, and the navigation between displayed content categories and content objects within each content.

In various examples, application module 120 may execute an application displaying a user interface, for example, an internet browser for allowing the user of the client device 102 to interact with the travel system 110. In other examples, the application module 120 executes a native application installed on the client device 102 that is associated with the travel system 110. In doing so, the user of the client device 102 may provide login credentials (e.g., a travel system user ID, password) to the travel system 110 through the application to authenticate an identity of the user and to access personalized content received from the travel system 110.

In various examples, the application module 120 provides a request to the travel system 110 to receive content recommendations. The request may be sent by the application module 120 in response to an action on the client device 102. For example, when the application module 120 launches the application associated with the travel system 110, the application module 120 can be configured to automatically send the request to the travel system 110. Likewise, the application module 120 can request content recommendations in response to a user input, such as selection of an option within the application associated with content recommendations. In response, the application module 120 can receive content recommendations from the travel system 110 and can present the received content recommendations to the user through the display interface 115 of the client device 102.

The display interface 115 is configured to present information to and receive input from a user of the client device 102. In some examples, the display interface 115 is a component of a travel system software application, while in other examples, the display interface comprises an operating system or other software API accessed and used by the travel system 100. The display interface 115 displays information such as content recommendations received from the travel system 110 within one or more interface portions. Additionally, the display interface 115 receives input (e.g., a user input or user selection) through input devices (e.g., a touchscreen) of the client device 102. In various examples, a user input may be a scroll gesture received on a client device touchscreen. In response, the display interface 115 may scroll all or a portion of a displayed interface (e.g., may scroll between presented content categories, or may scroll content objects within a presented content category).

The travel system 110 provides content recommendations for a user of the travel system that are displayed through the display interface 115 of the client device 102. In various examples, the content recommendations provided by a travel system 110 are uniquely tailored for each user. To do so, the travel system 110 may maintain information associated with each user such as the user's interests, a user's biographical information (e.g., name, age, hometown, birthplace), content the user has previously viewed or interacted with, user uploaded images, places a user has visited, user provided recommendations, and the like. Additionally, the travel system 110 may categorize users of the travel system 110 into various groups with one or more common interests (e.g., travel system characteristics), hereafter referred to as "tribes" of the travel system 110. Further details regarding the creation and the categorization of users of the travel system 110 into various tribes are described in U.S. application Ser. No. 14/171,521, which is hereby incorporated by reference.

To generate and provide content recommendations, the travel system 110 includes a content engine 200, a display interface engine 150, a content category storage module 160, and a content object storage module 170. The content engine 200 generates content recommendations for a user of the travel system 110. For example, the content engine 200 identifies one or more content categories stored in the content category store 160 that are likely of interest to the user of the travel system 110. Examples of content categories may include, but are not limited to: a little bit of history (content objects with particular historical relevance), backpacker favorites (content objects popular with users that enjoy backpacking), beat the heat (content objects that are appropriate when the temperature is high), breakfast and brunch spots, budget friendly dining, date night ideas, drink spot ideas, escape the gloom (content objects that are appropriate for adverse weather), events this week (event-type content objects occurring this week), fun with kids (kid-friendly content objects), get artsy (content objects that are popular with users that enjoy the arts), get caffeinated (coffee-related content objects), get outside (content objects involving the outdoors), get tipsy (content objects that are alcohol related), get your adventure on (content objects that are popular with adventurous users), go to bed (content objects associated with overnight stays), grab a drink, grab coffee & relax, grab dinner, happy hour o'clock, late night bites, lesbian/gay/bisexual/transgender (LGBT) friendly, local favorites (content objects popular with locals), lunch spots, luxury dining spots, nearby destinations (content objects within a threshold distance to the user), new in town (content objects that have opened within a recent threshold amount of time), outdoorsy friendly (content objects that accommodate people that enjoy the outdoors), rate it! (content objects that are seeking user feedback), restaurant ideas, satisfy your sweet tooth (content objects that are popular with users that enjoy sweet foods), something sweet (content objects for users seeking to make a romantic gesture), stay dry (content objects that are appropriate for inclement weather), stay warm (content objects that enable users to warm up), staycation! (content objects that are local to the user's location and popular with locals), things to do (content objects that give users ideas for activities), time to relax (content objects that are popular with users that enjoy relaxing activities), top cities, top drinks & nightlife, top hotels, top regions, top restaurants, top things to do, trendy dining, vegetarian friendly food, weekend getaways, and the like.

For each identified content category, the content engine 200 further identifies one or more content objects associated with the content category that are also likely to be of interest to the user of the travel system 110. Examples of content objects include a specific activity, a restaurant, an attraction, a gathering, a landmark, a public event, and the like. Each content object may have associated information (e.g., identifying information, operating hours, price range, ratings, descriptions (e.g., appropriate attire, reservations accepted, how busy the location is) and the like) that are stored in the content object store 170. Additionally, information associated with each content object also includes an identification of one or more content categories with which the content object is associated. For example, for a restaurant that serves coffee and brunch or breakfast, the travel system 110 may further store an identification of the "breakfast and brunch spots" and/or the "get caffeinated" content categories in association with the restaurant.

The display interface engine 150 provides an interface that includes the content recommendations to be presented through the display interface 115 of the client device 102. As used hereafter, content recommendations refer to both content categories and content objects associated with each content category. For example, reference is hereby made to FIG. 3A, which depicts an example interface 300 displayed by the display interface 115 of the client device 102. Generally, the interface 300 may include information pertaining to various context characteristics of a user (e.g., geographical location 302, time of day or week 306, and weather 304). Multiple content categories 310 and 315 may be displayed in interface portions of the interface 300 as horizontally scrollable categories. In the example illustrated in FIG. 3A, content category 310 ("Breakfast and Brunch Spots") includes a set of content objects (e.g., 330, 335, and others not shown), whereas content category 315 ("Events this Week") includes a second set of content objects (e.g., 340, 345, and others not shown). Each content object may display additional information identifying one or more tribes 333, 337 (e.g., vegetarian, foodies, families) of users of the travel system 110 for whom the content object is recommended.

Figure 3A:
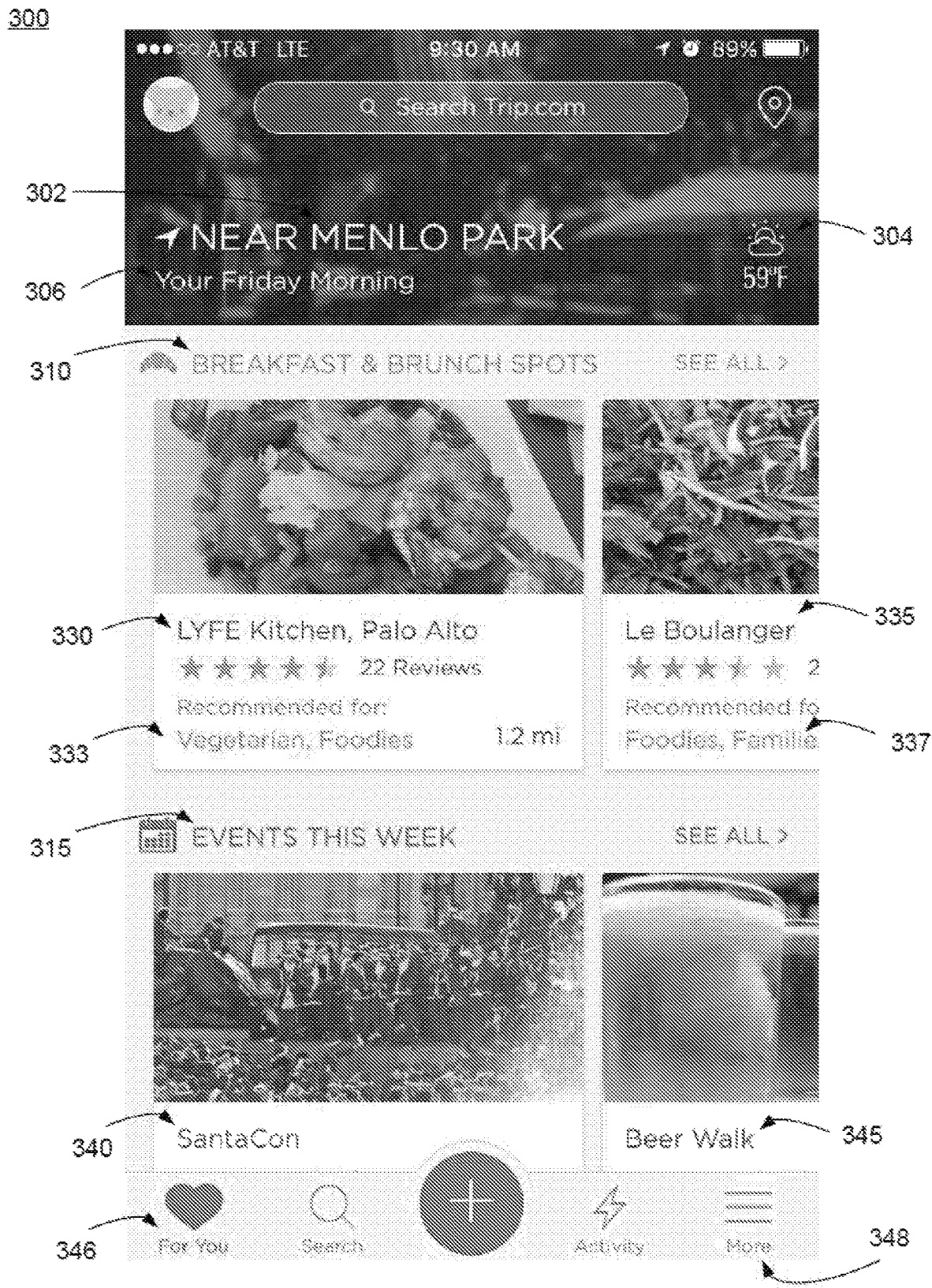
FIGS. 3A and 3B each depict an example display interface of the travel system, in accordance with one example.

In various examples, the display interface engine 150 provides instructions to the client device 102 as to how the content recommendations are to be displayed by the display interface 115 of the client device 102. Therefore, the client device 102 can update the display interface 115 accordingly. For example, the display interface engine 150 provides content categories, content objects, and instructions that specify where each content category and content object is to be placed on the interface 300 (or a ranking of content categories and content objects within each category and an instruction to display the content categories and content objects in ranked order). Referring to FIG. 3A, the display interface engine 150 may provide, to the client device 102, an instruction that the "Breakfast and Brunch Spots" content category 310 is located in a first interface portion of the interface 300. Additionally, the display interface engine 150 may provide, to the client device 102, an instruction that the "LYFE Kitchen, Palo Alto" content object 330 is to be placed at a first location within the first interface portion of the interface 300. In various examples, the "Breakfast and Brunch Spots" content category 310 and the "LYFE Kitchen, Palo Alto" content object 330 are respectively the content category and content object that the travel system 110 has identified to likely be the most relevant to the user of the travel system 110.

Selecting Content Recommendations

Figure 2:
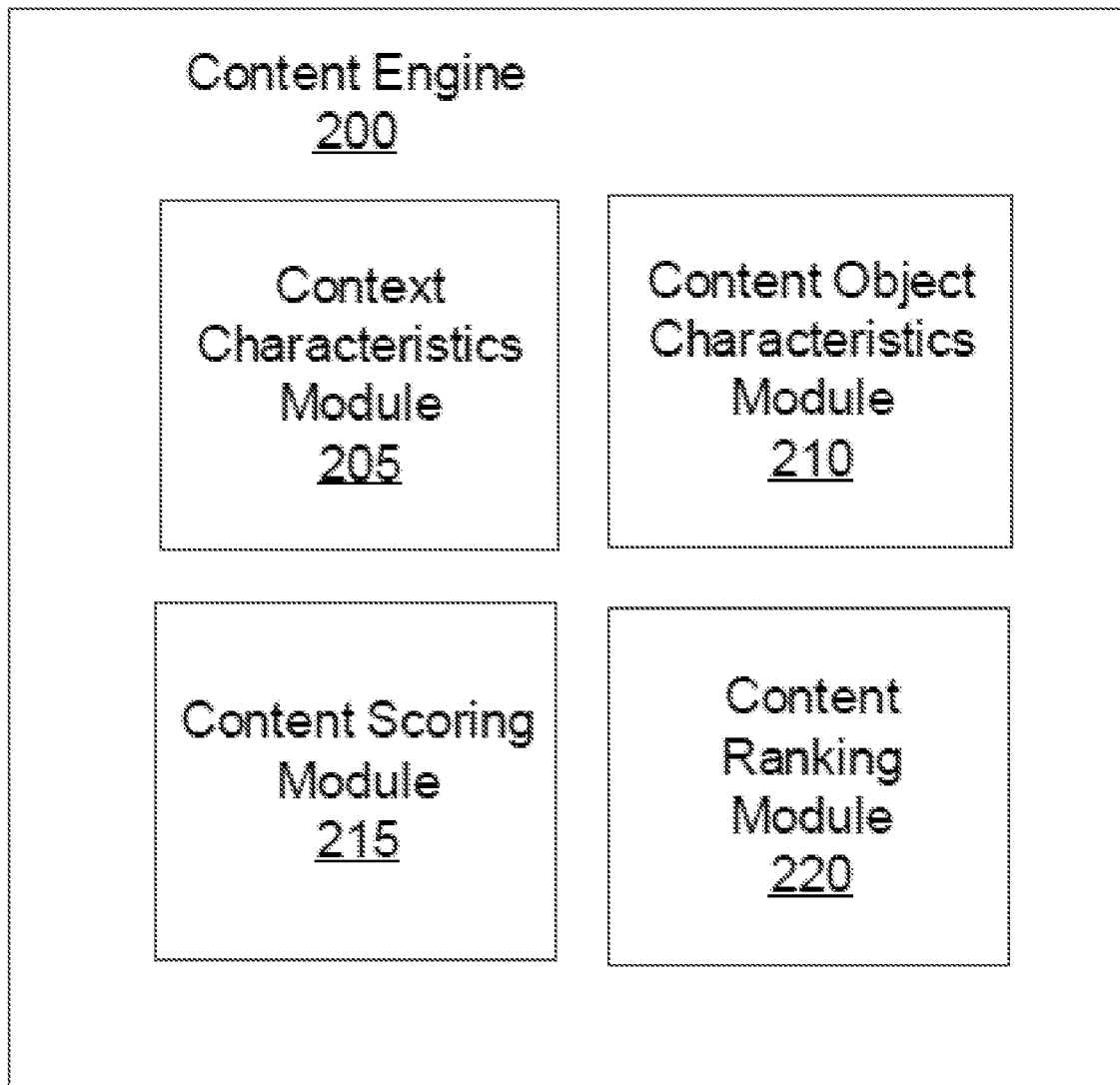
FIG. 2 is a block diagram of a content engine of the travel system, in accordance with one example.

FIG. 2 is a block diagram of a content engine of the travel system, in accordance with one example. The content engine 200 generates content recommendations for a user of the travel system 110 based on characteristics including context characteristics of the user and characteristics associated with content objects (e.g., content object characteristics). The content engine 200 includes a context characteristics module 205, a content object characteristics module 210, a content scoring module 215, and a content ranking module 220.

The context characteristics module 205 accesses various context characteristics of a user that are used in identifying the content categories that are to be presented to the user. Examples of context characteristics of the user include, but are not limited to: the user's current geographical location, whether the user is a traveler or a local based on the user's current geographical location, a current time of day, a current day of week, a current or future weather forecast, a current or future environmental condition (e.g., temperature, air quality, humidity), preferences associated with additional users of the travel system 110 in common tribes or with common characteristics as the user of the travel system 110, and the like.

The content object characteristics module 210 accesses various content object characteristics that are used in determining the content objects of selected content categories that are to be presented to the user of the travel system 110. Examples of content object characteristics include, but are not limited to: the user's current distance to the content object, a current status of the content object (e.g., open or closed), an ease or availability of transportation to the content object, preferences of additional users in a common tribe or with common characteristics as the user of the travel system 110, suitability of the content object based on a context characteristic (e.g., current weather or time of day), popularity of the content object based on user reviews, and the like.

The content scoring module 215 scores content categories and content objects within each content category based on the context characteristics of the user and content object characteristics, respectively. As such, the scored content categories and scored content objects within each content category can be provided to the content ranking module 220 in order to generate the content recommendations for a user of the travel system 110.

The content scoring module 215 may assign a weight to each context characteristic that is a measure of the importance of that context characteristic to the user in relation to other context characteristics of the user. One example ranking of context characteristics of the user includes: 1) whether the user is a traveler or a local based on the current geographical location, 2) a current time, 3) a current or future weather forecast, and 4) preferences of additional users in a common tribe of the travel system 110. In another example, the content scoring module 215 trains a machine learning model to assign and update weights assigned to each context characteristic based on actions taken by users within the travel system 110. For example, if a content category is presented to users of the travel system 110 but performs unexpectedly (e.g., exceeds expected interest or receives subpar interest from users), the machine learning model is trained to update the weight assigned to each context characteristic to reflect the increase or decrease in interest.

The content scoring module 215 may further determine a strength of association between each content category and each context characteristic of the user. A strength of association represents a measure of how relevant a content category is for a user of the travel system 110 associated with a particular context characteristic of the user. For example, if the context characteristic of the user identifies that the user of the travel system 110 is a traveler at a current geographical location, the content scoring module 215 may assign a high strength of association to a content category that is popular to travelers (e.g., top restaurants) and a low strength of association to a content category that is popular with locals (e.g., staycation!). Similarly, if the context characteristic of the user is a time of day in the morning (e.g., 8 AM), then the content scoring module 215 assigns a high strength of association to a content category that is relevant for that time of day (e.g., "get caffeinated" or "breakfast and brunch spots") whereas less relevant content categories (e.g., "late night bites" or "go to bed") are assigned a low strength of association.

The content scoring module 215 scores each content category based on the strength of association between the content category and each context characteristic of the user and associated context characteristic weight. The score for each content category represents an overall likely interest level of a user of the travel system 110 for that content category. A higher assigned strength of association and a greater weight for a context characteristic of the user results in a higher score for the content category in comparison to a lower assigned strength of association and/or a lower assigned weight (assuming all other variables are held constant). For example, the content scoring module 215 can determine a product of the assigned weight and the assigned strength of association for each context characteristic and sum all products to generate a score for the content category. The content scoring module 215 provides the score of each content category to the content ranking module 220.

For each content category, the content scoring module 215 further scores content objects within each content category. To identify content objects associated with each content category, the content scoring module 215 accesses information from the content object store 170 that identifies the content objects associated with each content category.

The content scoring module 215 scores each content object based on content object characteristics. In various examples, each content object characteristic is assigned a weight that indicates a relative importance of the content object characteristic to a user or to the content category associated with the content object characteristic in comparison to other content object characteristics. An example ranking of content object characteristics includes: 1) the user's current distance to a location associated with the content object, 2) a current status of the content object (e.g., open or closed), 3) an ease of transportation to the content object, and 4) preferences of additional users in a common tribe or with common characteristics as the user of the travel system 110.

Additionally, the content scoring module 215 determines a measure of interest for each content object characteristic. A measure of interest represents how likely a user of the travel system 110 is interested in a content object associated with the content object characteristic.

For example, if the content object characteristic is the user's current distance to a location associated with the content object, the measure of interest determined by the content scoring module 215 for the content object may scale inversely according to the distance. This reflects the fact that a user of the travel system 110 may be less interested in a content object that is farther in distance from the user. In various examples, the content scoring module 215 may compare the user's current distance to a location associated with the content object to a threshold distance. If the user's current distance to the content object is greater than the threshold distance, the content scoring module 215 assigns a low measure of interest for that content object.

If the content object characteristic is a current status of the content object, the content scoring module 215 may employ a scoring system such that if the content object is currently open, the content scoring module 215 assigns a first measure of interest. On the other hand, if the content object is currently closed, the content scoring module 215 assigns a second measure of interest that is lower than the first measure of interest. In other examples, the content scoring module 215 may further consider the time remaining until a content object is to open or close. For example, if the content object is to open or begin within a threshold amount of time (e.g., 1 hour, 30 minutes, or the like), the content scoring module 215 may assign a higher measure of interest in comparison to a measure of interest if the content object is closed for a longer duration of time. Alternatively, if the content object is to close or end within a threshold amount of time, the content scoring module 215 can assign a lower measure of interest in comparison to a measure of interest if the content object is to be open for a longer duration of time.

If the content object characteristic is the ease of transportation to the content object, the content scoring module 215 may consider various factors including ease of accessing public transportation to the content object, current traffic conditions to the content object, overall travel time to the content object, and the like. The measure of interest for the "ease of transportation" content object characteristic decreases as the difficulty to access or arrive at the content object increases.

If the content object characteristic refers to the preferences of additional users in a common tribe of the travel system 110 as the user, or with one or more characteristics in common with the user, the content scoring module 215 can determine a measure of interest for the content object based on the actions of the additional users in the common tribe. For example, if the user of the travel system 110 identifies as a vegetarian and is in the vegetarian tribe of the travel system 110, the content scoring module 215 identifies the actions of the additional users that are also in the vegetarian tribe. If the additional users in the vegetarian tribe often frequent a content object and consistently post positive reviews regarding the content object, the content scoring module 215 assigns a high measure of interest which reflects that the content object would likely be of interest to the user of the travel system 110.

In various examples, the content scoring module 215 determines, for each content category, a score for each content object associated with the content category based on the assigned weight and assigned measure of interest for each content object characteristic. The score represents an overall likelihood that the user of the travel system 110 will be interested in the content object. A higher assigned measure of interest and a higher assigned weight for a content object characteristic results in a higher score for the content object in comparison to a lower assigned measure of interest and/or a lower assigned weight (assuming all other variables are held constant). The content scoring module 215 provides the score for each content object to the content ranking module 220.

The content ranking module 220 ranks the content categories and content objects based on their respective scores and determines which content recommendations are to be provided to a user of the travel system 110. In various examples, the content ranking module 220 identifies and provides a threshold number of the top ranked content categories. Furthermore, for each of the top ranked content categories, the content ranking module 220 identifies a threshold number of the top ranking content objects associated with the content category. In one example, if a ranked content category does not include a threshold number of content objects, the content category itself is removed from the ranking to prevent the presentation of a content category that has an inappropriately low number of content objects.

In various examples, the content ranking module 220 sets a threshold content category score, such that if a score of a content category is not above the threshold content category score, the content category is not included in the ranking. Similarly, the content ranking module 220 sets a threshold content object score, such that if a score of a content object is not above the threshold content object score, the content object is not included in the ranking.

The content ranking module 220 may generate a list of ranked content categories as well as ranked content objects within each ranked content category. The ranked content categories and ranked content objects are provided to the display interface engine 150 of the travel system 110 for display to the user.

Example Display Interfaces of Content Recommendations

Figure 3B:
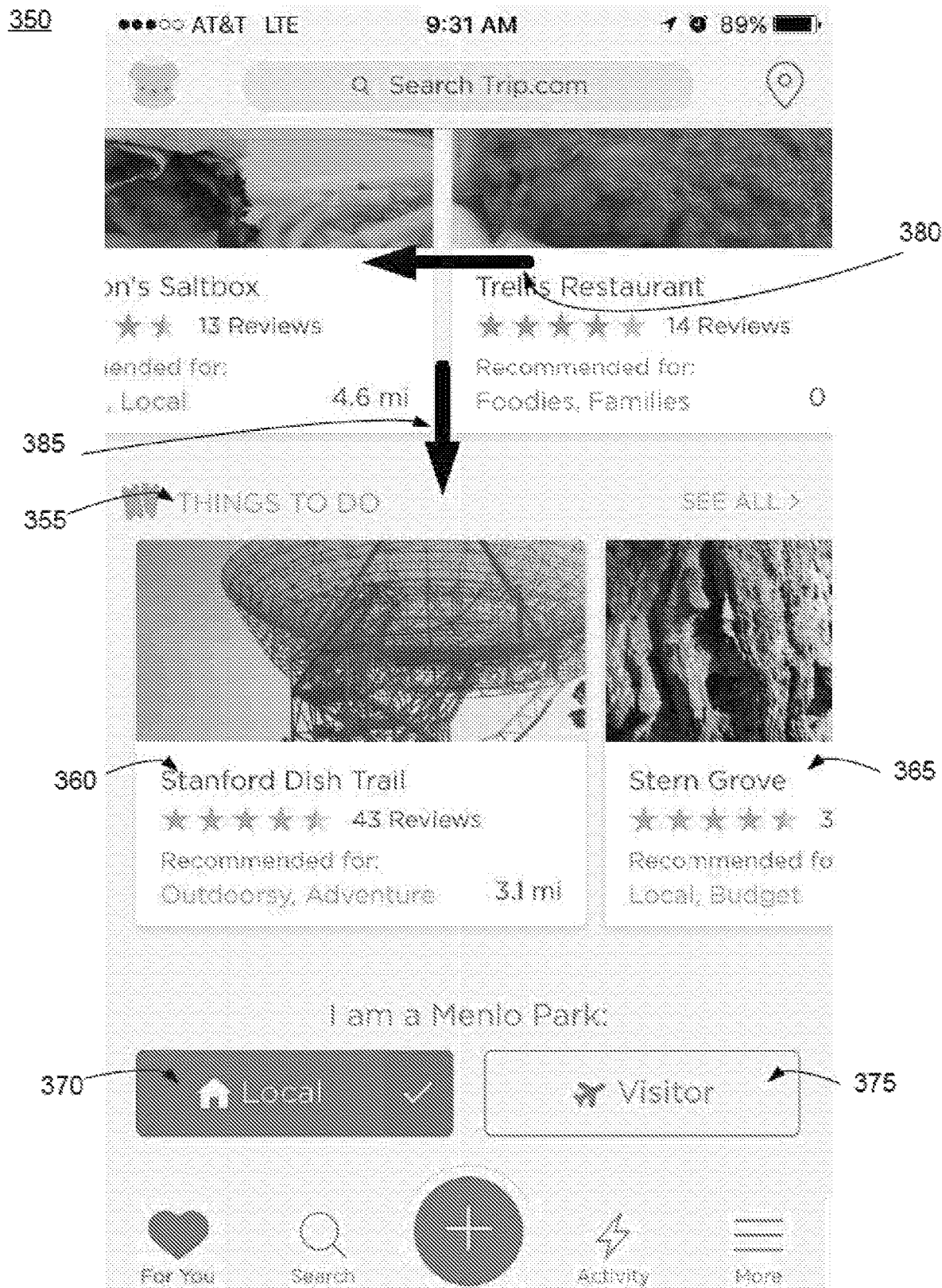

FIGS. 3A and 3B each depict an example interface 300 of the travel system 110, in accordance with one example. As previously described, the interface 300 depicted in FIG. 3A includes information associated with various context characteristics of the user 302 (location), 304 (weather conditions), and 306 (time). Additionally, the interface 300 includes interface portions that each identify a content category 310 and 315, and content objects 330, 335, 340, and 345 each displayed within a content category. More specifically, FIG. 3A depicts content objects "LYFE Kitchen, Palo Alto" 330 and "Le Boulanger" 335 which are categorized in the content category "Breakfast and Brunch Spots" 310.

In various examples, the interface 300 depicted in FIG. 3A serves as the landing page that is displayed through a display interface 115 of the client device 102. In other words, when the application module 120 of the client device 102 executes the application associated with the travel system 110, the travel system 110 provides content recommendations such that the first interface displayed through the display interface 115 of the client device 102 is the interface 300 as depicted in FIG. 3A.

Each content recommendation is presented in the interface 300 according to a likelihood that the user of the travel system 110 would be interested in the recommendation. For example, the most prominently presented content category (e.g., "Breakfast and Brunch Spots" 310) is the content category that is likely to be of highest interest to the user of the travel system 110 based on the context characteristics of the user. Additionally, within each content category, the most prominently presented content object (e.g., "LYFE Kitchen, Palo Alto" 330) is the content object that is likely to be of highest interest to the user of the travel system 110. The additional content categories (e.g., "Events this Week" 315 and additional content categories not currently shown in FIG. 3A) are also included in the interface 300 at less prominent positions (e.g., below content category 310) given that a user of the travel system 110 is determined to be less likely to be interested in the additional content categories than in the content category 310. Similarly, additional content objects (e.g., "Le Boulanger" 335 and additional content objects not currently shown in FIG. 3A) are also included in the interface 300 at less prominent positions (e.g., to the right of content object 330) given that the user of the travel system 110 is determined to be less likely to be interested in the additional content objects than in the content object 330.

Individual content categories of a plurality of content categories presented on the screen (e.g. 310, 315) may be independently scrollable eg. independently horizontally scrollable, or independently vertically scrollable.

In various examples the interface 300 is further configured to display a different interface in response to a user input. As one example, the interface 300 further includes additional selectable options such as "For You" 346, "search," "activity," and "more" 348 options. When the interface 300 receives an input on a selectable option, the interface 300 is configured to display a corresponding interface (e.g., a search interface, an activities interface, a more options interface).

The interface 300 can be updated in response to a scrolling input. In one example, the scrolling input is a downward scrolling gesture 385 received through the display interface 115 of the client device 102. Therefore, as depicted in FIG. 3B, a second example interface 350 may be displayed. The second example interface 350 differs from the interface 300 depicted in FIG. 3A in that the second example interface 350 displays a different set of content recommendations. As specifically depicted in FIG. 3B, the additional content recommendations include a different content category 355 (e.g., "Things to Do") as well as content objects (e.g., "Stanford Dish Trail" 360 and "Stern Grove" 365) of that content category 355. In various examples, the content categories displayed in FIG. 3B (e.g., 355) are ranked lower than the content categories depicted in FIG. 3A (e.g., 310 and 315).

In another example, the scrolling input is a horizontal scrolling gesture 380 within an interface portion. For example, the horizontal scrolling gesture 380 causes the interface to correspondingly scroll content objects displayed within a content category to more prominently display a different content object (e.g., "Trellis Restaurant"). Similarly, a leftward horizontal scrolling gesture on an interface portion that identifies the "Things to Do" 355 content category causes the second interface 350 to more prominently display the "Stern Grove" 365 content object as opposed to the "Stanford Dish Trail" 360 content object.

In various examples, as shown in FIG. 3B, the second interface 350 also includes a selectable option that identifies whether the user of the travel system 110 is a local or a visitor of the current geographical location (e.g., Menlo Park) of the user. The travel system 110 may use the local/visitor identification provided by the user as a context characteristic of the user in identifying the content recommendations to provide to the user of the travel system 110.

Figure 4A:
FIGS. 4A and 4B depict example display interface navigations, in accordance with one example.

The interface 300 and the second interface 350 are each configured to provide additional information regarding a specific content object. For example, FIG. 4A depicts an example display interface navigation, in accordance with one example. In various examples, a content object interface 400 is presented on a display interface 115 of the client device 102 in response to receiving an input such as a touch selection gesture of a specific content object. For example, referring to the interface 300 depicted in FIG. 3A, a touch selection gesture received on the content object 330 invokes the content object interface 400 depicted in FIG. 4A.

Referring to FIG. 4A, the content object interface 400 may include an identification of the content object (e.g., "LYFE Kitchen, Palo Alto" 330) as well as the content category that the content object is associated with (e.g., "Breakfast and Brunch Spots" 310). Additionally, the content object interface 400 displays various content object characteristics including overall feedback 410 of the content object, a distance 415 to the content object from the location of the user, a current status 420 of the content object, and measures of popularity 425 of the content object amongst various tribes of the travel system 110.

Figure 4B:
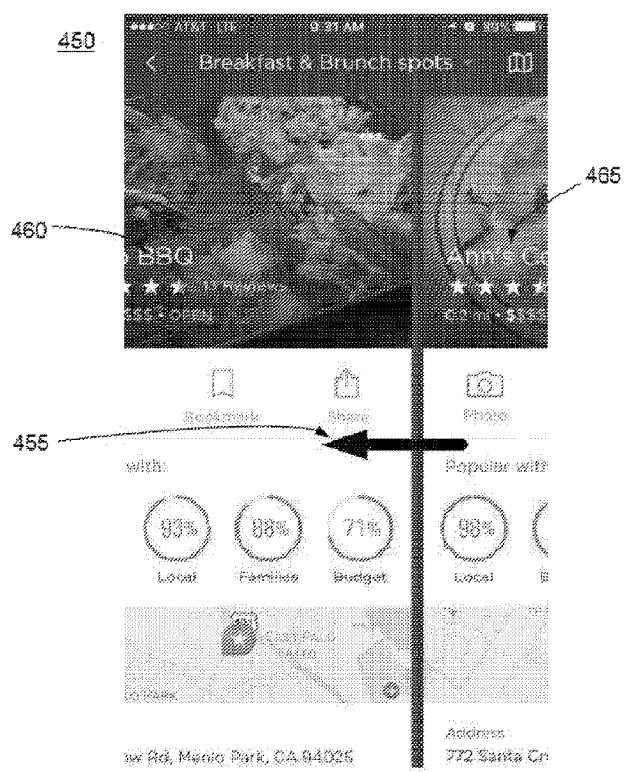

The content object interface 400 is further configured to display a second content object interface in response to a user input. For example, FIG. 4B depicts the transitioning 450 from a first content object interface that includes information of a first content object to a second content object interface that includes information of a second content object. The user input may be a left, horizontal scrolling gesture provided by a user of the travel system 110 on the client device 102. Therefore, the identification of the content object 460 and other associated information is replaced by an identification of the second content object 465 and information corresponding to the second content object. In various examples, the second content object 465 may be the content object that is ranked immediately after the first content object 460 within a content category. Furthermore, additional content object interfaces can be displayed in response to additional left, horizontal scrolling gestures, each additional content object interface corresponding to a successively lower ranked content object that is associated with the content category 310.

Process of Selecting and Displaying Content Recommendations

Figure 5:
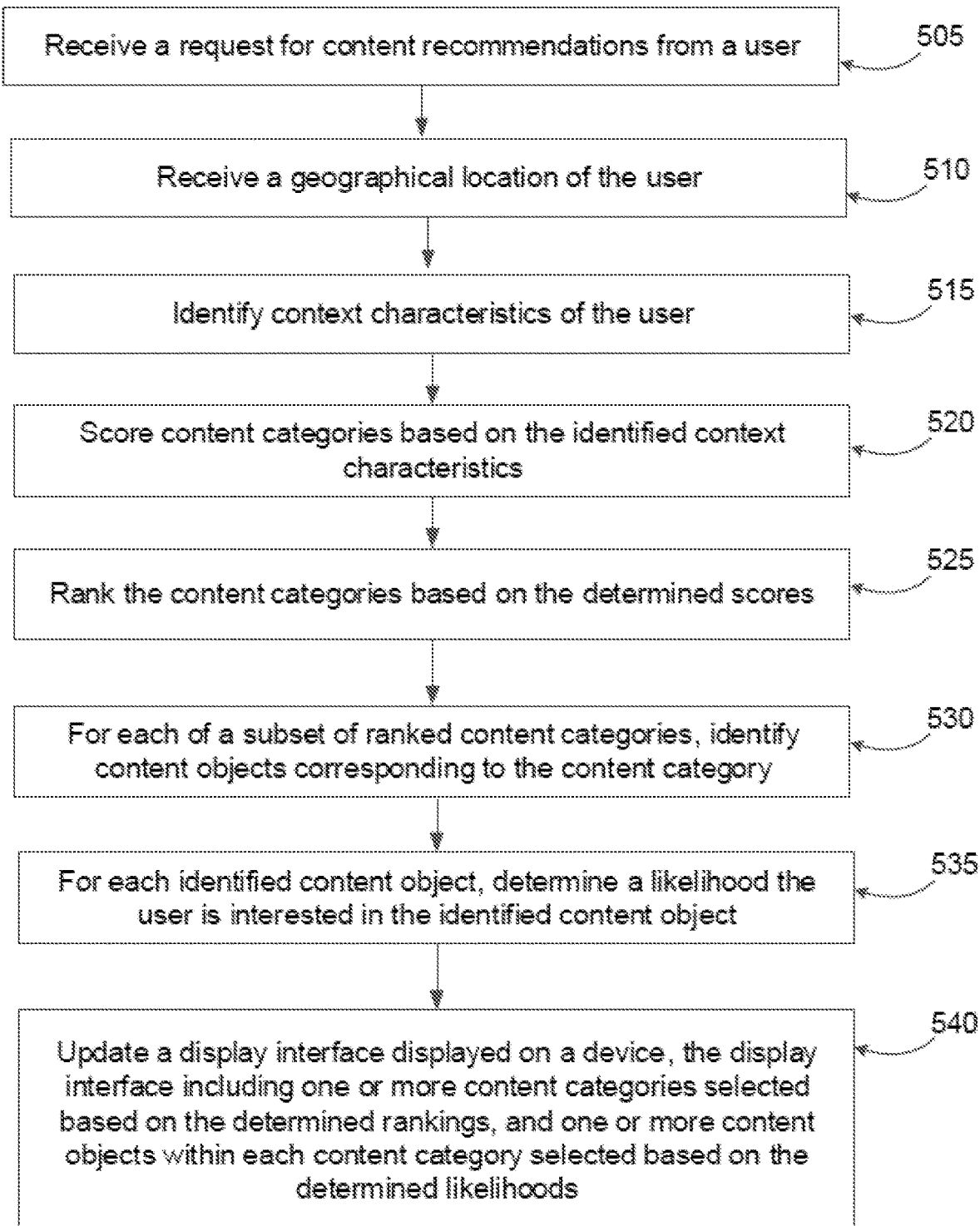
FIG. 5 is a flowchart of a process for generating content recommendations for display within a display interface of a client device, in accordance with one example.

FIG. 5 is a flowchart of a process for generating content recommendations for display within a display interface 115 of a client device 102, in accordance with one example. The travel system 110 receives 505 a request for content recommendations for a specific user of the travel system 110 and also receives 510 the user's geographical location. The travel system 110 identifies 515 context characteristics of the user such as a location of the user, whether the user is local or traveling, the current or future weather forecast at the location, the current time of day at the location, and the current day of the week at the location, characteristics of the location (e.g. density of points of interest, existence of physical or geopolitical boundaries), and specific characteristics of the user (e.g., the user's tribes, implicit interests). Using these identified context characteristics of the user, the travel system 110 scores 520 various content categories, each score indicative of how likely the user of the travel system 110 is to be interested in the content category. In various examples, to calculate scores for each content category, the travel system 110 determines a strength of association between a content category and each context characteristic of the user, and calculates the score based on the determined strengths of association.

The travel system 110 ranks 525 the various content categories based on the determined scores. In various examples, a subset of the ranked content categories are selected based on the determined rankings. For each ranked content category from the subset of ranked content categories, the travel system 110 identifies 530 content objects that correspond to the content category. For each identified content object, the travel system 110 determines 535 a score representative of a user's likely level of interest in the identified content object based on characteristics of the content object and/or based on the context characteristics of the user.

The travel system 110 updates 540 a display interface that is displayed on a client device 102. The updated display interface includes at least one interface portion that identifies a content category and further includes a set of content objects that corresponds to the content category. In various examples, the most prominently placed content category (e.g., the top content category depicted in FIG. 3A) is the highest ranked content category. Similarly, the most prominently placed content object within a content category is the highest ranked content object for the user of the travel system 110. Therefore, the user of the travel system 110 can be provided with content recommendations that are highly relevant to the user.

Selection and Rating of Locations and Related Content Based on User Categorization Users of travel systems can prioritize different types and aspects of travel. For instance, some users can prioritize budget or low-cost travel, others can prioritize luxury travel, and others can prioritize family travel. A pre-determined categorization of users with a common travel preference is referred to herein as a "tribe." For instance, users that prioritize student travel are referred to herein as the "student" tribe. Accordingly, each tribe of users is associated with a travel category (or "tribe category" herein). Examples of tribe categories include, but are not limited to: budget travel, luxury travel, business travel, family travel, singles travel, student travel, wedding travel, honeymoon travel, bachelor/bachelorette travel, food travel, trendster travel, nightlife travel, adventure travel, outdoor activity travel, art & design travel, backpack travel, environmentally friendly or "green" travel, history travel, lesbian/gay/bisexual/transgender or "LGBT" travel, local culture travel, spiritual travel, vegetarian travel, wellness travel, and the like.

A set of weights can be determined for a user, indicating the user's preferences for each of one or more tribes. In some examples, each weight in the determined set of weights is a measure of affinity. For instance, if a user prioritizes student travel, the measure of affinity between the user and the student tribe can be determined to be 0.8 (on a scale of 0.0 to 1.0), and if the user does not prioritize family travel, the measure of affinity between the user and the family tribe can be determined to be 0.2. In some examples, for each user, a measure of affinity is determined between the user and every tribe. The measures of affinity for a user can be organized into an ordered set or a vector (referred to herein as a "tribe vector") associated with the user, with each entry of the tribe vector being a measure of affinity between the user and a particular tribe. It should be noted that the measures of affinity between a user and particular tribes can be determined independently. As a result, a user can be associated with identical or similar measures of affinity for tribes with seemingly contradicting priorities. For instance, a user can be associated with a measure of affinity of 0.65 for the budget tribe, and a measure of affinity of 0.63 for the luxury tribe.

It should be noted that for the purposes of simplicity, the remainder of this description will refer to the sets of weights determined for a user as a set of measures of affinity organized into a user tribe vector. Further, it should be noted that instead of determining a set of weights for a user, a set of weights can be determined for a particular location query or a content request. For instance, for a content request, a user can select a particular tribe with which to identify content. In such an example, the selected tribe is not necessarily representative of the user's tribe preferences, and is instead used for a one-time content request.

Travel systems can organize travel information by location, and can include pages dedicated to locations. Examples of locations include countries, states, cities, towns, geographic areas, bodies of water, hotels, restaurants, spas, businesses, tourist attractions, museums, monuments, houses/lodges/cabins, and the like. Scores can be determined for locations, each representing a strength of association between a location and a tribe (hereinafter "tribe scores"). In some examples, such tribe scores are measures of affinity between a location and a tribe. The measures of affinity between locations and tribes can also be organized into location tribe vectors. Each entry of a location tribe vector associated with a location is a measure of affinity representing an affinity between a particular tribe and the location.

Travel systems can include content objects associated with locations, such as images, videos, ratings, scores, reviews, recommendations, itineraries, identities or usernames of users that have visited the locations, and the like. Content objects can include locations themselves. Such content objects can be displayed within pages dedicated to locations. For instance, for a page dedicated to the location "Rome, Italy", the page can include images taken of/in Rome, reviews and recommendations of hotels in Rome, a list of users that have visited Rome, and the like. Content objects may be created and uploaded by users.

Tribe scores can also be determined for content objects, with each tribe score representing a strength of association between a content object and a tribe. In some examples, such tribe scores are measures of affinity between a content object and a tribe. The measures of affinity between content objects and tribes can also be organized into tribe vectors. Each entry of a tribe vector associated with a content object is a measure of affinity representing an affinity between a particular tribe and the content object. It should be noted that for the purposes of simplicity, the remainder of this description will refer to a set of tribe scores determined for a location or content object as a set of measures of affinity organized into a location or content object tribe vector.

Tribe vectors can be used to improve the experience of a user of a travel system. For instance, tribe vectors can be used to select locations for display in response to a search query, and to order selected locations. In addition, tribe vectors can be used to select content objects for display within a location page or within another travel system page or context. The computing and use of tribe vectors in a travel system is described below in greater detail.

System Environment

Figure 6:
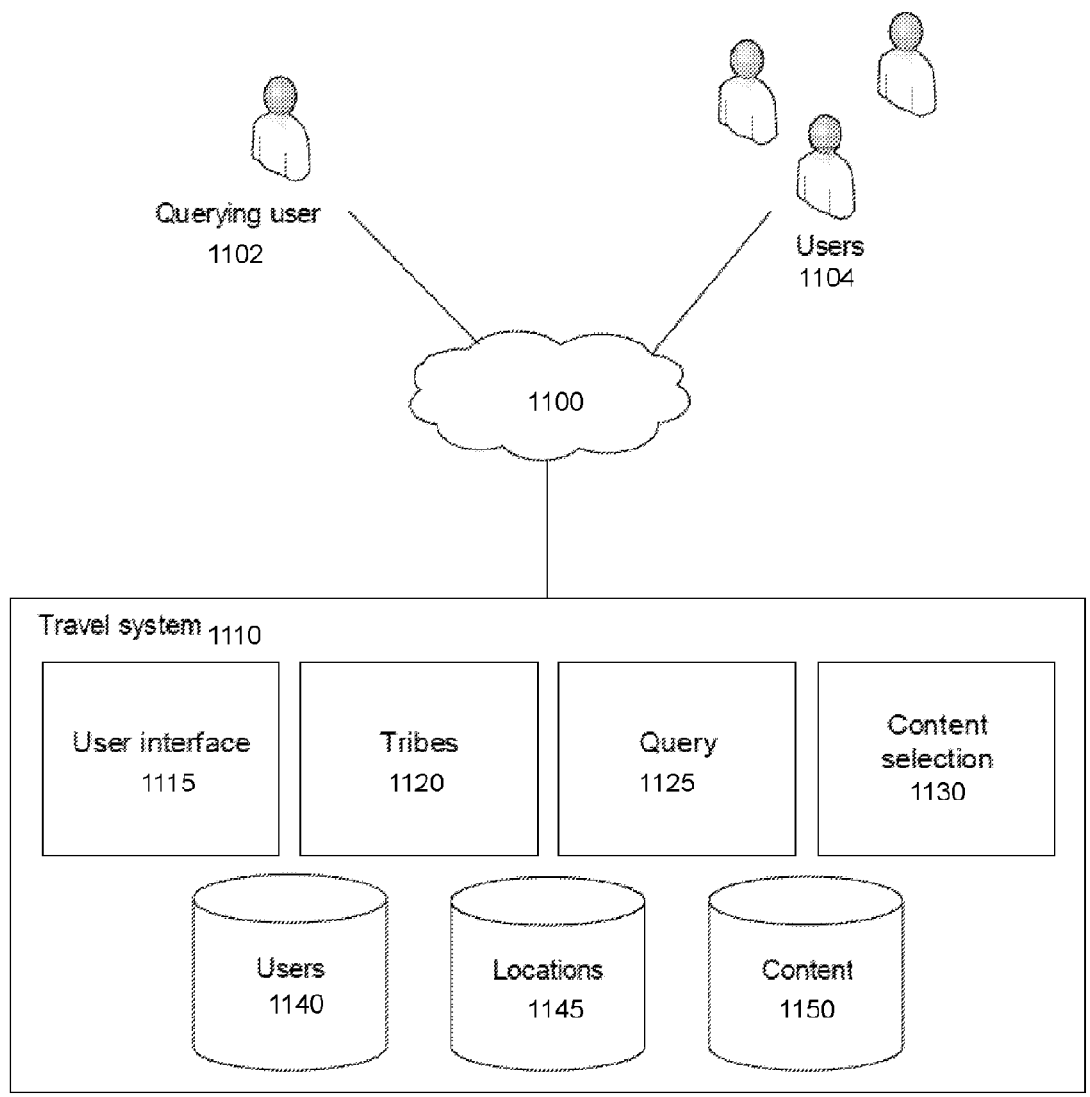
FIG. 6 is a network diagram of a system environment for selecting locations and content objects based on tribe vectors for display in a travel system.

FIG. 6 is a network diagram of a system environment for selecting locations and content objects based on tribe vectors for display in a travel system, in accordance with an example. The system environment includes a querying user 1102, one or more other users 1104, and a travel system 1110, each of which are communicatively coupled via the network 1100. It should be noted that although the querying user and the other users are shown as directly coupled to the network 1100, in practice the users access the travel system via one or more client devices (not shown in FIG. 6), such as a computer, mobile device, tablet, and the like.

The querying user 1102 and the users 1104 can each be associated with a travel system user account, can have a screen name associated with the user account, and can have a profile associated with the user account. A user profile can include information uploaded by the user, such as biographical information, images, and the like. A user profile can also include information associated with a user's travels, such as locations the user has visited, content objects associated with locations uploaded by the user, and the like. For the purpose of simplicity, the remainder of this description will presume that each of the users 1104 has established a user profile and a user account. In addition, the remainder of this description will presume that the travel system 1110 includes content objects associated with locations created or uploaded by the users 1104. In practice, any number of users (such as hundreds or millions) can use the travel system, and can create or upload any number of content objects associated with any number of locations.

The querying user 1102 can access the travel system 1110 via the network 1100, and can perform any number of functions associated with the travel system. For instance, the querying user may plan a trip using the travel system, create an itinerary, purchase airfare, and the like. The querying user can query the travel system to identify potential locations for visiting, and the travel system can present location results in response to the query. The querying user can visit a page associated with a location, can browse content objects (such as images and reviews) associated with the location, and can upload or create content objects for the location. The querying user can also interact with other users, can visit profile pages or other users, and the like.

The querying user 1102 communicates with and accesses the travel system 1110 via the network 1100. The network may be a local area network, a wide area network, the Internet, or any other network or combination of networks that allows communication between the entities of FIG. 6. The network may use standard communications technologies and/or protocols and may include wireless and/or wired communication protocols.

The travel system 1110 can be a personal computer, a server, a data center, or any other computing device or system including a processor and configured to execute applications and/or computer instructions for performing the functionalities described herein. The travel system 1110 includes a user interface module 1115, a tribes module 1120, a query module 1125, a content selection module 1130, a users storage module 1140, a locations storage module 1145, and a content storage module 1150. It should be noted that in other examples, both the travel system specifically and the environment of FIG. 6 generally include additional components not illustrated in the example of FIG. 6.

The users storage module 1140 stores information associated with users of the travel system 1110, such as profile page information, user account information, user biographical information, user history and preferences, and tribe vectors associated with users. The locations storage module 1145 stores information associated with locations, such as geographical information, travel-related information, a location category (such as "city," "restaurant," and the like), and tribe vectors associated with locations. The content storage module 1150 stores information associated with content objects, such as the content objects themselves (images, reviews, and the like), the identity of the location to which each content object is associated, the identity of the user that created or uploaded the content object, and tribe vectors associated with the content objects.

The user interface module 1115 provides the communicative interface between users and the travel system 1110. For instance, communications, such as search queries and requests for content, are received from the querying user 1102 and are routed by the user interface module to the query module 1125 and the content selection module 1130, respectively. Likewise, content objects received from a user 1104 are stored by the user interface module in the content storage module 1150. Communications from the travel system to a user are also routed by the user interface module. For instance, location search results from the query module and content objects selected by the content selection module are routed to the querying user by the user interface module. The user interface module can present one or more interfaces (such as graphical user interfaces, webpage, application interfaces, and the like) to users accessing the travel system.

The tribes module 1120 creates tribe vectors for users of the travel system 1110, for locations, and for content objects, for instance based on information stored in the users storage module 1140, the locations storage module 1145, and the content storage module 1150, respectively. Users, locations, and content objects are collectively referred to herein as "travel system entities." It will be assumed for the remainder of the description that a tribe vector is created for each user of the travel system, for each location tracked by the travel system, and for each content object stored by the travel system, though it should be emphasized that in other examples, tribe vectors are only determined for certain users, locations, and/or content objects.

The tribes module 1120 creates a tribe vector for a travel system entity by determining a measure of affinity between the entity and each of a set of tribes, and by combining the determined measures of affinity into a vector. The tribes module can create a tribe vector for each travel system entity in advance of a received query or content request, upon the creation or uploading of an entity, in response to a search query or request for content received from a user, or in response to any other suitable event. The remainder of this description will presume that tribe vectors are computed for each entity in advance of receiving a query or content request.

The tribes module 1120 can determine measures of affinity for a user based on the preferences of the user. A user can select a priority for each tribe, and a measure of affinity can be determined for each tribe based on the user priority selection. For example, a user can select the "luxury" tribe as high priority, the "family" tribe as medium priority, and the "student" tribe as low priority. In response, the tribes module can determine a measure of affinity of 0.8 for the luxury tribe, 0.5 for the family tribe, and 0.2 for the student tribe. In some examples, users can select measures of affinity for tribes directly, for instance by entering a score between 0 and 100 for each tribe, or by adjusting a slider bar or dial that adjusts a measure of affinity for a particular tribe.

The tribes module 1120 can also determine measures of affinity for a user indirectly based on actions of the user. In such instances, measures of affinity can be determined based on tribes associated with a location. For example, if a user navigates to locations associated with a first set of tribes more often than if the user navigates to locations associated with a second set of tribes, the measures of affinity between the user and the first set of tribes can be greater than the measures of affinity between the user and the second set of tribes. Similarly, for content objects created or uploaded by a user in association with particular locations, measures of affinity can be determined for the user based on the tribes associated with the locations. Further, measures of affinity can be determined based on the user's check-ins to particular locations (the use of location-detection functionality on a device by a user to indicate the presence of the user at a location), a user's prior travel to particular locations, and the like.

The tribes module 1120 can also determine measures of affinity for a user based on characteristics of the user. For example, if a user is friends with or has otherwise established a connection with other users associated with high measures of affinity with a first set of tribes and/or low measures of affinity with a second set of tribes, the tribes module can determine high measures of affinity between the user and the first set of tribes and/or low measures of affinity with a second set of tribes. Further, measures of affinity can be determined based on biographical information provided by the user. For instance, if the user indicates that he is a student, a high measure of affinity can be determined between the user and the "student" tribe, and a low measure of affinity can be determined between the user and the "luxury" tribe. Finally, measures of affinity can be determined for a user based on common characteristics between the user and other users. For instance, if a set of users with a common characteristic (such as age, education, profession, family or relationship status, and the like) is associated with high or low measures of affinity for particular tribes, then similar measures of affinity can be determined for the particular tribes for a user sharing the common characteristic.

The tribes module 1120 can determine measures of affinity for a user based additionally on the actions of other users. For example, if a user is indicated by other users as an expert in a particular type of travel (such as "family" travel), the tribes module can determine a measure of affinity for the user based on the indication. In addition, if a set of users associated with particular tribes frequently communicate with or interact with a user, the tribes module can determine measures of affinity for the particular tribes for the user based on the communications or interactions.

The tribes module 1120 can determine measures of affinity for locations. Measures of affinity can be determined for a location based on the measures of affinity of users that navigate to, check-in to, or otherwise interact with a page associated with the location. Measures of affinity for a location can be determined based on an association of the location with particular tribes by users ("tags"). For example, if more users tag a restaurant as "budget" than "luxury," the measure of affinity between the location and the budget tribe can be higher than between the location and the luxury tribe. Measures of affinity for a location can also be computed based on the manual association of particular tribes by trusted users, by travel system editors, or by individuals associated with the location itself (such as owners or employees).

The tribes module 1120 can determine measures of affinity for content objects created or uploaded by users. In one example, the measures of affinity between a particular content object and various tribes are the same as or similar to the measures of affinity between the user that created or uploaded the content object and the various tribes. Measures of affinity for a content object can also be determined based on the measures of affinity between the location to which the content object is associated and various tribes. Measures of affinity for a content object can also be determined based on characteristics of the content object. For example, if the content object includes the words "expensive" or "opulent," a higher measure of affinity can be determined for the "luxury" tribe than for the "budget" tribe. In addition, measures of affinity for a content object can also be determined based on tags of the content object with particular tribes, for instance by the user that created or uploaded the content object, or by users that view or access the content object.

It should be emphasized that measures of affinity determined by the tribes module 1120 can be determined based on any combination of the factors described herein, or based on additional factors not described herein. For instance, the tribes module can mine data from external entities or web pages, from social networks, and the like to determine measures of affinity between travel system entities and tribes. Further, tribe vectors can be updated periodically, in response to certain actions taken by the users, or in real-time. It is presumed that ordering of the measures of affinity within the tribe vectors is substantially similar between travel system entities, with a particular entry of each tribe vector associated with one of a pre-determined set of tribes. Further, the tribe module can normalize measures of affinity associated with a particular tribe based on the number of users, locations, or content objects associated with measures of affinity for the tribe above a pre-determined threshold. For example, if the distribution of measures of affinity for a first tribe is skewed towards the bottom of a measure of affinity range, the measures of affinity can be normalized such that the distribution of the measures of affinity for the first tribe is more similar to the distribution of measures of affinity for a second tribe.

Figure 7:
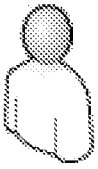
FIG. 7 illustrates example tribe vectors for various entities.
Figure 7:
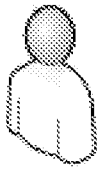

FIG. 7 illustrates example tribe vectors for various entities, in accordance with an example. The tribe vectors of FIG. 7 include ordered measures of affinity between an entity and each of six tribes. These tribes are, in order: a business tribe, a luxury tribe, a family tribe, an adventure tribe, a budget tribe, and a student tribe. In other words, a particular position within each vector represents the affinity score between an associated entity and one of the six tribes. The four entities of FIG. 7 are user 1200, user 1202, location 1204, and review 1206. The tribe vector for user 1200 can be written as the vector T1200=[0.85, 0.18, 0.44, 0.31, 0.81, 0.06], can be displayed as a histogram, or can be represented in any other suitable method. Although the measures of affinity illustrated in FIG. 7 and described herein are numerical and between the values of 0 and 1, it should be emphasized that any data type or value can be used to represent measures of affinity for the purposes described herein.

Returning to the environment of FIG. 6, the query module 1125 receives, via the user interface module 1115, a location search query from the querying user 1102. In response to receiving the search query, the query module queries the locations storage module 1145 to identify a set of locations that satisfy the criteria of the received search query. For example, the query module can query the locations storage module to identify locations stored in the locations storage module associated with text or with a category associated with the received search query. In some examples, the received search query represents a search for locations generally (such as vacation locations), or for locations of a particular type. For example, the querying user can perform a search for cruise destinations, for restaurants within a geographic area, for tourist attractions within a particular city, and the like. The query module identifies a set of locations that match the received query. For instance, if the received query represents a search for restaurants in Northern California, the query module can query the locations storage module to identify a set of restaurants in Northern California. Likewise, if the received query represents a search for hotels in Rome, the query module can query the locations storage module to identify a set of hotels in Rome. In addition to identifying a set of locations in response to the received query, the query module also accesses the tribe vectors associated with each of the identified set of locations. The query module also accesses a tribe vector associated with the querying user 1102 from the users storage module 1140.

The query module 1125 selects a subset of locations from the identified set of locations for display to the querying user 1102. By selecting the most relevant subset of locations for display, the travel system 1110 beneficially improves the experience of the querying user in identifying locations most suitable or interesting to the querying user. The query module uses the accessed tribe vector associated with the querying user and the accessed tribe vectors associated with the identified set of locations to identify the most relevant locations within the identified set of locations. In one example, the query module identifies one or more tribes associated with the highest measures of affinity within the tribe vector associated with the querying user, and selects locations from the identified set of locations based on the values of the measures of affinity for the identified one or more tribes in the tribe vectors associated with the identified set of locations. For instance, if the greatest measure of affinity of a querying user's tribe vector is an affinity between the querying user and the "luxury" tribe, the query module can select a threshold number of locations from the identified set of locations including the highest measures of affinity for the luxury tribe.

The query module 1125 can also select a subset of locations from the identified set of locations based on other measures of similarity between the tribe vector associated with the querying user 1102 and the tribes vectors associated with the identified set of locations. In one example, the query module determines, for each location in the set of locations, a measure of correlation between the tribe vector associated with the user and the tribe vector associated with the location, such as a dot product or other suitable measure. In this example, the query module can select a subset of locations for display based on the determined measures of correlation, for instance, a threshold number of locations associated with the highest measures of correlation. Any other suitable measure of similarity can be used to identify the most relevant locations for display, for instance the cross-correlation between a user's tribe vector and a location tribe vector, the minimum entropy between the user's tribe vector and a location tribe vector, and the like.

The query module 1125, in response to selecting a subset of the identified set of locations, can display the selected subset of locations to the querying user 1102. In some examples, the selected subset of locations can be ordered by location type, by location popularity or rating, or by a strength of keyword match between a user's query and text associated with each location. The query module can also order the selected subset of locations based on the determined measures of similarity between the tribe vector associated with the querying user and the tribe vectors associated with the selected locations. For instance, if the subset of locations is selected based on the dot product between the user's tribe vector and the tribe vectors associated with the identified set of locations, then the locations in the subset of locations can be ordered from greatest dot product to smallest dot product.

In some examples, instead of computing a measure of correlation between a user tribe vector and each location tribe vector, the query module 1125 determines an overall score for each location in the set of locations based on a set of weights associated with a location query and a set of tribe scores associated with each location in the set of locations. In such examples, the query module can rank the locations based on the determined overall scores, and can select a subset of the locations based on the ranking of locations.

Figure 8:
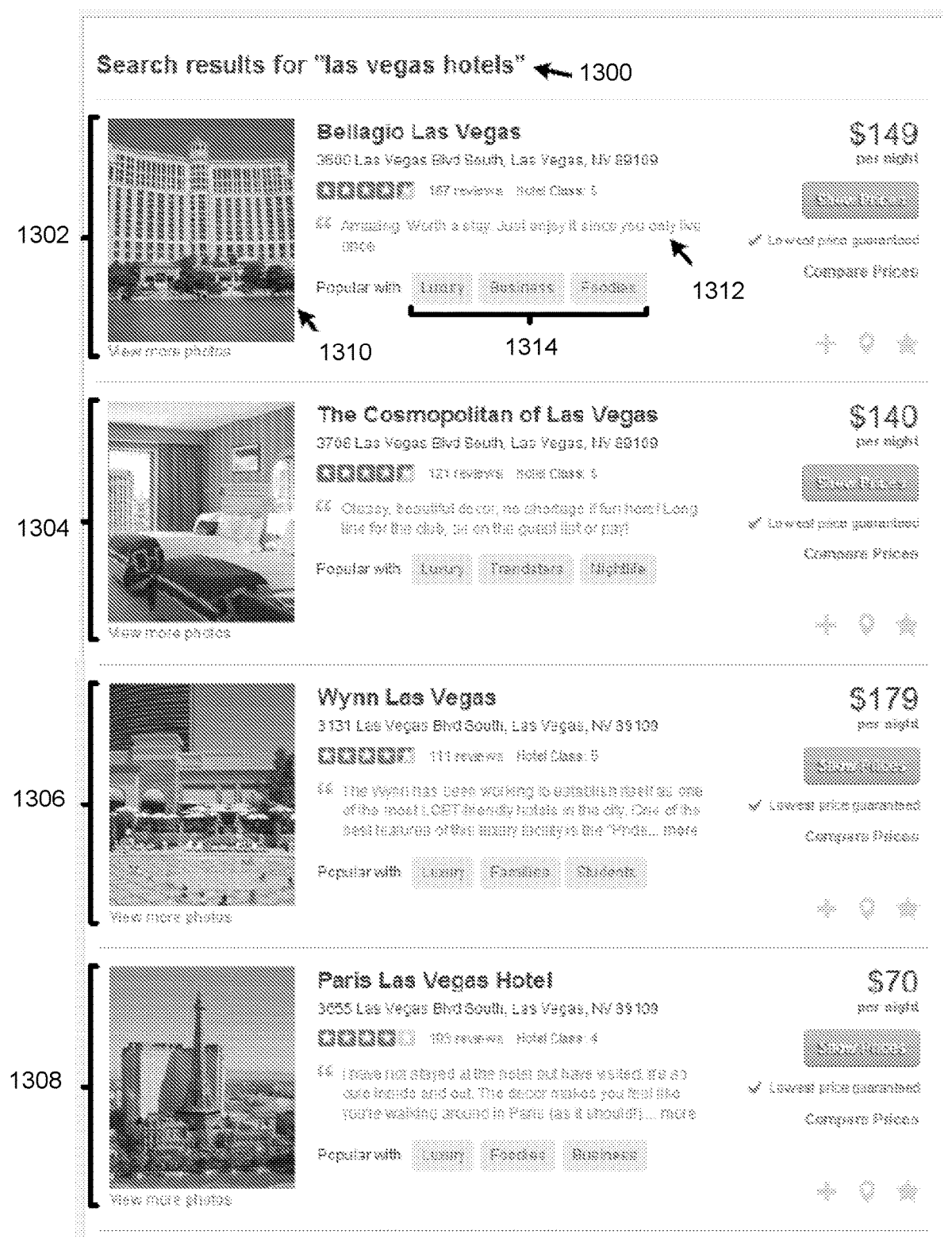

FIG. 8 illustrates the display of locations selected based on tribe vectors in response to a search query, in accordance with an example. In the example of FIG. 8, a querying user 1102 associated with a tribe vector that includes a large measure of affinity for the "luxury" tribe enters the search query "las vegas hotels" 1300 into a website associated with the travel system 1110. In response, the query module 1125 identifies a set of hotels located in Las Vegas, Nevada, and further selects a subset of hotels (hotels 1302, 1304, 1306, and 1308) based on the tribe vector associated with the querying user and tribe vectors associated with the identified set of hotels. Each of the selected subset of hotels is associated with a tribe vector with a greatest measure of affinity for the luxury tribe. The selected subset of hotels are displayed by the query module, and are ordered within the display by rating. The display of each hotel further includes a photo 1310 associated with the hotel, a review 1312 associated with the hotel, tribes 1314 associated with the greatest measures of affinity within the tribe vector associated with the hotel, address information, price information, rating information, and the like.

Returning to the environment of FIG. 6, the content selection module 1130 receives, via the user interface module 1115, a request for content objects from the querying user 1102. In response to receiving the request for content objects, the content selection module queries the content storage module 1150 to identify a set of content objects based on the request. For example, the content selection module can query the content storage module to identify content objects stored in the content storage module associated with text or with a category associated with the request for content. The request for content can be explicit, for instance if a user selects a link configured to display photographs of a monument. In such examples, the content selection module identifies photographs associated with the monument. The request for content can also be implicit, for instance if a querying user accesses a page associated with a particular location, and the page includes fields or portions configured to display content objects associated with the location. In such examples, the content selection module identifies content objects associated with a location in response to the querying user accessing the page associated with the location. The content selection module also accesses a tribe vector associated with each identified content object from the content storage module, and accesses a tribe vector associated with the querying user from the users storage module 1140.

The content selection module 1130 selects a subset of content objects from the identified set of content objects for display to the querying user 1102. As with before, selecting the most relevant subset of content objects for display beneficially improves the querying user's experience in using the travel system 1110. The content selection module uses the accessed tribe vector associated with the querying user and the accessed tribe vectors associated with the identified set of content objects to identify the most relevant content objects within the identified set of content objects. In one example, the content selection module identifies one or more tribes associated with the highest measures of affinity within the tribe vector associated with the querying user, and selects content objects from the identified set of content objects based on the values of the measures of affinity for the identified one or more tribes in the tribe vectors associated with the identified set of content objects. For instance, if the greatest measure of affinity of a querying user's tribe vector is an affinity between the querying user and the "family" tribe, the query module can select a threshold number of content objects from the identified set of content objects including the highest measures of affinity for the family tribe.

The content selection module 1130 can also select a subset of content objects from the identified set of content objects based on other measures of similarity between the tribe vector associated with the querying user 1102 and the tribes vectors associated with the identified set of content objects. Similarly to the query module 1125, the content selection module can determine, for each content object in the set of content objects, a measure of correlation between the tribe vector associated with the user and the tribe vector associated with the content object, such as a dot product or other suitable measure. In this example, the content selection module can select a subset of content objects for display based on the determined measures of correlation, for instance, a threshold number of content objects associated with the highest measures of correlation. Any other suitable measure of similarity can be used to identify the most relevant content objects for display, for instance the cross-correlation between a user's tribe vector and a content object tribe vector, the minimum entropy between the user's tribe vector and a content object tribe vector, and the like.

The content selection module 1125, in response to selecting a subset of the identified set of content objects, can display the selected subset of content objects to the querying user 1102. In some examples, the selected subset of content objects can be ordered by content object type, by a strength of keyword match between a user's query and text associated with each content object, or the like. The content selection module can also order the selected subset of content objects based on the determined measures of similarity between the tribe vector associated with the querying user and the tribe vectors associated with the selected content objects. For instance, if the subset of content objects is selected based on the dot product between the user's tribe vector and the tribe vectors associated with the identified set of content objects, then the content objects in the subset of content objects can be ordered from greatest dot product to smallest dot product.

In some examples, instead of computing a measure of correlation between a user tribe vector and each content object tribe vector, the content selection module 1130 determines an overall score for each content object in the set of content objects based on a set of weights associated with a content request and a set of tribe scores associated with each content object in the set of content objects. In such examples, the content selection module can rank the content objects based on the determined overall scores, and can select a subset of the content objects based on the ranking of content objects.

Figure 9:
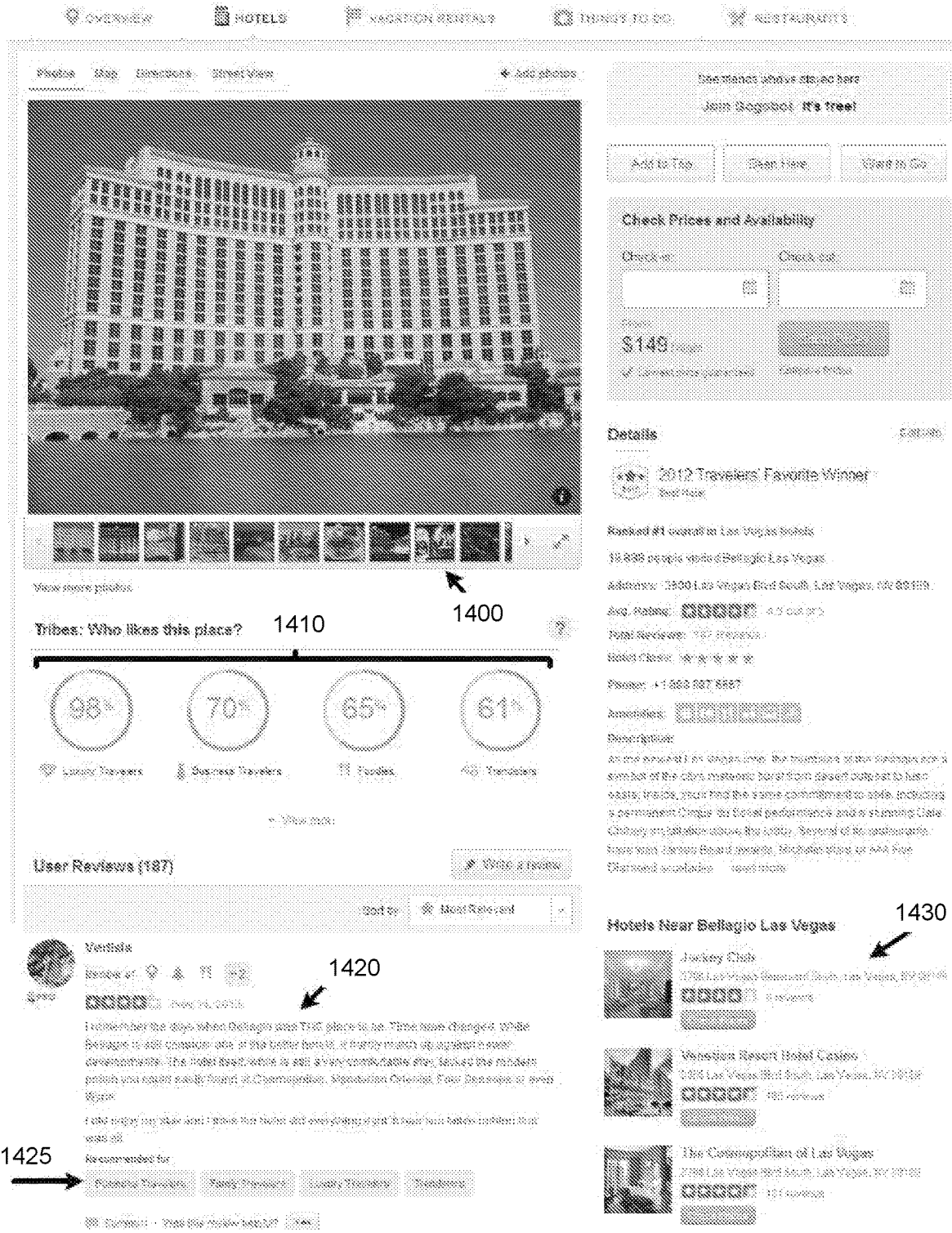
FIG. 9 illustrates the display of content objects selected based on tribe vectors within a location page.

FIG. 9 illustrates the display of content objects selected based on tribe vectors within a location page, in accordance with an example. The location page of FIG. 9 is associated with the location "The Bellagio Las Vegas," a hotel within Las Vegas, Nevada. The location page includes several portions configured to display content objects, such as images 1400 associated with the Bellagio and a review 1420 associated with the Bellagio. In response to a querying user 1102 accessing the page of FIG. 9, the content selection module 1130 identifies a set of images associated with the Bellagio, and selects a subset of images from the identified set of images based on the tribe vector associated with the querying user and the tribe vectors associated with the identified set of images. For example, the content selection module can select images for display associated with tribe vectors that result in an above-threshold dot product with the tribe vector associated with the querying user. Similarly, the content selection module can identify a set of reviews associated with the Bellagio, and can select a review from the identified set of reviews based on a measure of correlation between the tribe vector associated with the identified set of reviews and the tribe vector associated with the querying user.

The location page of FIG. 9 further includes measures of affinity 1410 between various tribes and the location "The Bellagio Las Vegas," such as a measure of affinity of 98% for the luxury tribe, a measure of affinity of 70% for the business tribe, and so on. The location page of FIG. 9 also includes tribes 1425 with which the displayed review 1420 has been tagged or is otherwise associated with, for instance the tribes associated with the greatest measures of affinity in the tribe vector associated with the display review. The location page of FIG. 9 also includes recommendations for hotels 1430 near the Bellagio, which can be selected based on a similarity between tribe vectors associated with the hotels 1430 and a tribe vector associated with the location "The Bellagio Las Vegas" or the querying user 1102. Finally, the location page also includes rating information, price information, geographic information, and the like.

A landing page can be displayed by the travel system 1110 to a querying user 1102, for instance when the querying user initially accesses the travel system, or when the querying user navigates to a home page portion of the travel system. The landing page can be populated with content objects based on the tribe vector associated with the querying user. For instance, if the tribe vector associated with the querying user includes high measures of affinity between the LGBT tribe, the luxury tribe, and the business tribe, content objects associated with tribe vectors including high measures of affinity for one or more of three tribes can be selected and displayed on the landing page. In some examples, a querying user can view different landing pages by selecting a "lens" (a tribe vector associated with a particular type of user, such as a user strongly associated with the "student" tribe, a user strongly associated with the "family" tribe, and the like), and the travel system can select locations and content objects for display in a landing page based on the selected lens.

Similarly, locations and/or content objects can be selected by the travel system 1110 for recommendation to the querying user 1102 based on a correlation or similarity between the tribe vector associated with the querying user and tribe vectors associated with locations and content objects. In one example, locations and/or content objects selected for recommendation to the querying user are displayed on a landing page, or within portions of other pages displayed by the travel system. Alternatively, locations and/or content objects selected for recommendation can be emailed to a querying user, presented within an application associated with the travel system, used to target advertising to the querying user, and the like.

Tribe vectors associated with travel system entities can be displayed within the travel system 1110. For instance, a tribe vector associated with a user can be displayed in a profile page associated with a user or within any other interface associated with the user. Similarly, tribe vectors associated with locations and content objects can be displayed in dedicated pages or interfaces associated with the locations and content objects, respectively. Displaying a tribe vector can include displaying a histogram representative of the tribe vector (with each histogram bar associated with a particular tribe, and with the height of the bar representative of the measure of affinity associated with the tribe). Tribe vectors can also be displayed in any other suitable form, for instance by displaying numerical values representative of the measures of affinity included in the tribe vectors, by displaying heat maps emphasizing tribes associated with the highest measures of affinity and de-emphasizing tribes associated with the lowest measures of affinity, and the like.

Operation

Figure 10:
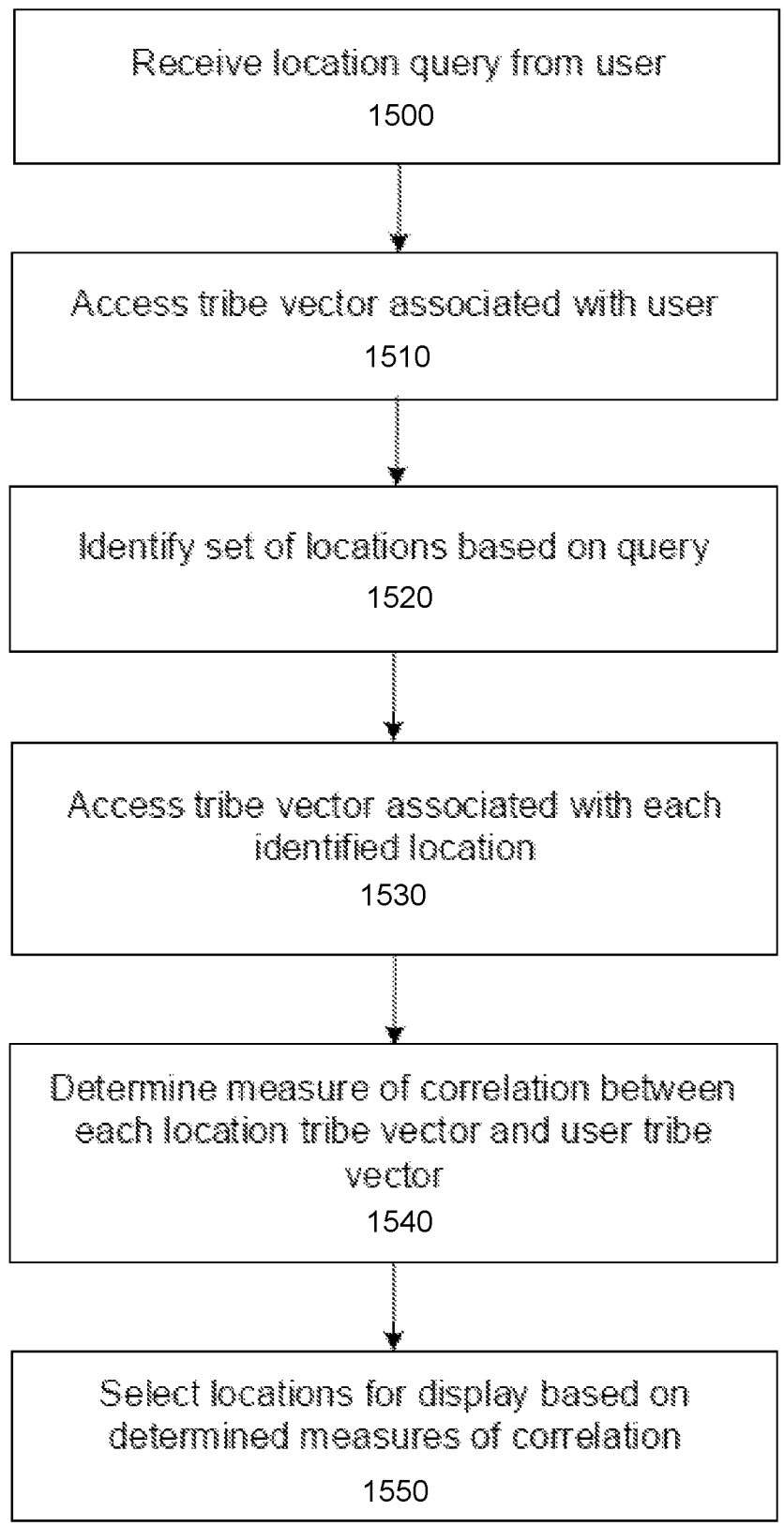
FIG. 10 is a flowchart of a process for selecting locations for display in response to receiving a search query.

FIG. 10 is a flowchart of a process for selecting locations for display in response to receiving a search query, in accordance with an example. In the example of FIG. 10, a location query is received 1500 from a querying user. For instance, the location query can include a keyword search for a particular type of location, such as the search query "Hotels in Barcelona." A tribe vector associated with the querying user is accessed 1510. For example, a tribe vector can be computed for the querying user in response to receiving the query, or a pre-computed tribe vector associated with the querying user can be retrieved in response to receiving the query.

A set of locations is identified 1520 based on the query. Locations can be identified based on a category included in the received query, based on a keyword match between the received query and text associated with locations, and the like. A tribe vector associated with each location is accessed 1530. As with the tribe vector associated with the querying user, the tribe vectors associated with each location can be computed in response to receiving the query, or can be pre-computed and retrieved in response to receiving the query.

A measure of correlation is determined 1540, for each identified location, between the tribe vector associated with the location and the tribe vector associated with the querying user. Each determined measure of correlation can be a dot product between tribe vectors, a cross-correlation between tribe vectors, or any other measure of relatedness or similarity. A subset of the set of locations can be selected 1550 for display based on the determined measures of correlation. For instance, a threshold number of locations associated with the highest determined measures of correlation can be selected and displayed as a set of search results.

Figure 11:
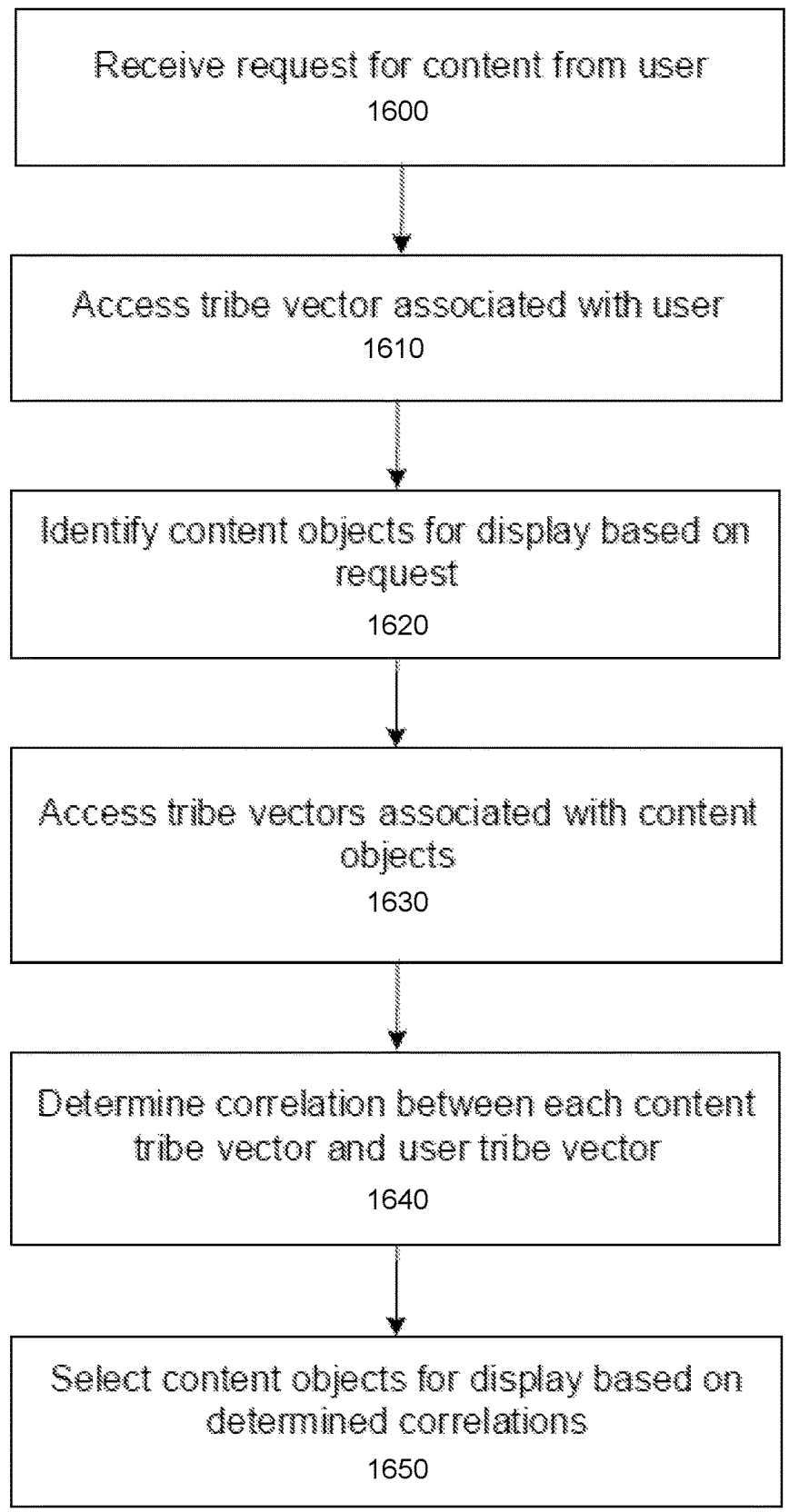
FIG. 11 is a flowchart of a process for selecting content for display in response to receiving a request for content.

FIG. 11 is a flowchart of a process for selecting content for display in response to receiving a request for content, in accordance with an example. In the example of FIG. 11, a request for content is received 1600 from a requesting user. For instance, the request for content can be a request from the requesting user to access a webpage associated with a location, or a request from the requesting user to view reviews or images associated with a location. A tribe vector associated with the requesting user is accessed 1610. For example, a tribe vector can be computed for the requesting user in response to receiving the request, or a pre-computed tribe vector associated with the requesting user can be retrieved in response to receiving the request.

A set of content objects is identified 1620 based on the request. Content objects can be identified based on a content object type associated with the received request (e.g., images or reviews), based on a location associated with the request (such as review associated with the location), and the like. A tribe vector associated with each content object is accessed 1630. As with the tribe vector associated with the requesting user, the tribe vectors associated with each content object can be computed in response to receiving the request, or can be pre-computed and retrieved in response to receiving the request.

A measure of correlation is determined 1640, for each identified content object, between the tribe vector associated with the content object and the tribe vector associated with the requesting user. As described above, each determined measure of correlation can be a dot product between tribe vectors, a cross-correlation between tribe vectors, or any other measure of relatedness or similarity. A subset of the set of content objects can be selected 1650 for display based on the determined measures of correlation. For instance, the content object associated with the highest determined measure of correlation can be selected and displayed within a page associated with the received request.

SUMMARY

A travel system generates and provides content recommendations to a user of the travel system. The travel system identifies content categories that are likely to be of interest to the user of the travel system based on context characteristics of the user such as whether the user is a traveler or a local at a particular geographic location. Additionally, the travel system further identifies content objects (e.g., attractions, activities, events, restaurants, businesses, and the like) for each identified content category that are likely to be of interest to the user based on characteristics of each content object. The identified content categories and content objects are provided as content recommendations for display to a user of the travel system, enabling a user to quickly navigate between content categories and content objects within each content category.

Targeted location-based search results can be provided to a user of a travel system based on one or more tribes of users to which the user belongs. A user can provide a search query, and a set of locations can be identified in response. A subset of the set of locations may be selected for display based on a correlation between a tribe vector associated with the user and tribe vectors associated with each identified location. A user can also request content objects from the travel system, for instance by navigating to a page associated with a location including portions for displaying content objects. A set of content objects may be identified in response to a request for content, and a subset of the content objects may be selected for display based on a correlation between the tribe vector associated with the user and tribe vectors associated with each content object.

The foregoing description of the examples of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the examples of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one example, a software module is implemented with a computer program product comprising a computer-readable medium containing computer program code, which can be executed by a computer processor for performing any or all of the steps, operations, or processes described.

Examples of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the invention may also relate to a product that is produced by a computing process described herein. Such a product may comprise information resulting from a computing process, where the information is stored on a non-transitory, tangible computer readable storage medium and may include any example of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the examples of the invention is intended to be illustrative, but not limiting, of the scope of the invention, which is set forth in the following claims.

The invention claimed is:

1. A computer-implemented method for selecting content for display to a user in a travel system comprising:
   identifying, by a server of the travel system, a plurality of context characteristics of the user based on a location of the user;
   for each of a plurality of content categories, scoring the content category based on the identified plurality of context characteristics of the user;
   for each of a subset of the plurality of content categories selected based on a score of each content category:
      identifying, by the server, one or more content objects corresponding to the content category, each content object associated with a physical location within a threshold proximity of the location of the user; and updating, by the server, a display interface displayed by a mobile device of the user, the updated display interface comprising a plurality of interface portions such that each interface portion identifies a selected content category and displays the identified one or more content objects corresponding to the selected content category.

2. The method of claim 1, wherein the plurality of context characteristics of the user comprises one or more of:
an indication of whether the user lives within a threshold proximity of the location or is traveling;
a current time of day;
a current day of week;
a current or future weather forecast;
characteristics of the location; or
a preference associated with an additional user of the travel system with one or more travel system characteristics in common with the user.

3. The method of claim 1, wherein the one or more characteristics of the content object comprises:
a distance from the user to a location of the content object;
a current status of the content object;
a popularity of the content object;
a suitability of the content object based on a context characteristic;
one or more actions of an additional user of the travel system with one or more travel system characteristics in common with the user, the one or more actions performed in relation to the content object; or
one or more available modes of transportation to the location of the identified content object.

4. The method of claim 1, the method including:
receiving, at a server of the travel system, a request from a mobile device of the user for content recommendations;
receiving, from the mobile device of the user, a location of the user;
ranking, by the server, the plurality of content categories based on the content category scores;
for each of a subset of the plurality of content categories selected based on the content category rankings:
identifying, by the server, one or more content objects corresponding to the content category, each content object associated with a physical location within a threshold proximity of the location of the user; and
for each identified content object, determining, by the server, a likelihood that the user is interested in the identified content object based on one or more characteristics of the content object; and
updating, by the server, a display interface displayed by the mobile device of the user, the updated display interface comprising a plurality of interface portions such that each interface portion identifies a selected content category and displays a set of content objects corresponding to the selected content category and selected based on the determined likelihoods that the user is interested in the content objects.

5. The method of claim 1, wherein scoring the content category comprises determining a strength of association between the content category and each context characteristic of the user.

6. The method of claim 1, wherein the display interface is configured to scroll and display additional content in response to receiving a user scroll input on the display interface.

7. The method of claim 6, wherein the user scroll input comprises a vertical gesture, and wherein the displayed additional content comprises one or more additional interface portions each identifying a different selected content category.

8. The method of claim 6, wherein the user scroll input comprises a horizontal gesture within an interface portion, and wherein the displayed additional content comprises one or more different content objects corresponding to the selected content category identified by the interface portion.

9. The method of claim 1, wherein individual content categories of a plurality of content categories presented on the display interface are independently scrollable.

10. The method of claim 9, wherein the individual content categories of the plurality of content categories presented on the display interface are independently horizontally scrollable.

11. The method of claim 9, wherein the individual content categories of the plurality of content categories presented on the display interface are independently vertically scrollable.

12. The method of claim 1, wherein the display interface further comprises a selectable button that enables the user to indicate whether the user is a local of or a traveler to the location of the user.

13. The method of claim 1, further comprising:
responsive to receiving a selection of a content object displayed in an interface portion, updating the display interface to display information comprising one or more of:
an identification of the content object;
images of the content object;
information describing the content object; and
an indication of a popularity of the content object within a set of users of the travel system.

14. The method of claim 1, the method further comprising a method for selecting content for display to a user in the travel system, the method comprising:
maintaining a plurality of tribes, each tribe comprising a predefined categorization of users of the travel system;
receiving the request for content from the user;
accessing a set of weights associated with the request for content, each weight comprising a measure of the user's interest in a tribe of the plurality of tribes;
identifying a set of content objects based on the received request;
for each identified content object:
accessing a set of tribe scores associated with the identified content object comprising a tribe score for each of one or more of the plurality of tribes, each tribe score representing a strength of association between the content object and a corresponding tribe of the plurality of tribes; and
determining, by a processor, an overall score for the identified content object by applying the accessed set of weights to the accessed set of tribe scores;
ranking the content objects of the set of content objects based at least in part on the determined overall scores; and
selecting a subset of content objects from the set of content objects for display to the user based on the ranking of content objects.

15. The method of claim 14, wherein accessing a set of weights associated with the request for content comprises accessing a user tribe vector associated with the user, the user tribe vector comprising, for each of the one or more of the plurality of tribes, a measure of affinity between the user and the tribe.

16. The method of claim 14, wherein accessing a set of tribe scores associated with an identified content object comprises accessing a content object tribe vector associated with the content object, the content object tribe vector comprising, for each of the one or more of the plurality of tribes, a measure of affinity between the content object and the tribe.

17. The method of claim 14, wherein the received request for content comprises a location query, and where the identified set of content objects comprises a set of locations.

18. The method of claim 17, wherein a location in the set of locations comprises one of: a city, a hotel, a restaurant, a park, a tourist attraction, a business, or a body of water.

19. The method of claim 14, wherein a content object in the set of content objects comprises one of: an image, a video, a review, a rating, and a recommendation.

20. The method of claim 14, wherein determining an overall score for an identified content object comprises determining a measure of correlation between the accessed set of weights and the accessed set of tribe scores.

21. The method of claim 20, wherein determining a measure of correlation between the accessed set of weights and the accessed set of tribe scores comprises determining a dot product between the accessed set of weights and the accessed set of tribe scores.

22. The method of claim 14, wherein the plurality of tribes includes a tribe comprising a set of users associated with one of: a preference for budget travel, a preference for luxury travel, a preference for business travel, a preference for student travel, and a preference for family travel.

23. The method of claim 1, wherein the mobile device is a smartphone or a tablet computer.

24. The method of claim 1, wherein the displayed content objects include one or more of: advertisements; hotels; flights; train journeys; discounted travel deals.

25. The method of claim 1, wherein selected content categories include one or more of: places to eat, events, things to do, hotels, flights, train journeys, or discounted travel deals.

* * * * *